INVENTOR
E. J. WILKENS, JR
BY
Brendan A. Ward
ATTORNEY

Nov. 24, 1970  E. J. WILKENS, JR  3,542,965
INTEROFFICE CALL DIVERTER
Filed June 18, 1968  14 Sheets-Sheet 7

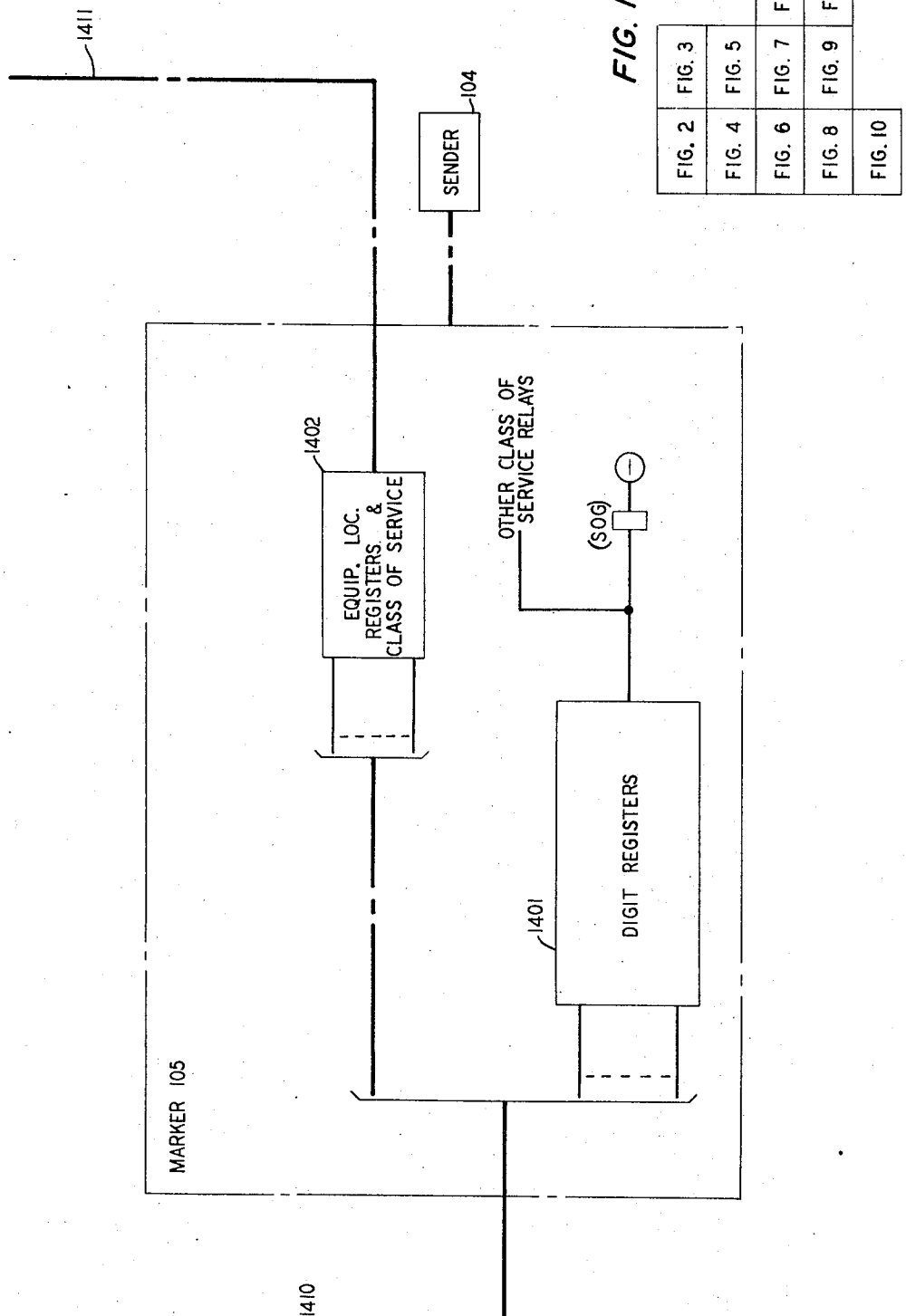

United States Patent Office 3,542,965
Patented Nov. 24, 1970

3,542,965
INTER-OFFICE CALL DIVERTER
Edward J. Wilkens, Jr., Freehold, N.J., assignor to Bell Telephone Laboratories, Incorporated, Murray Hill, N.J., a corporation of New York
Filed June 18, 1968, Ser. No. 737,979
Int. Cl. H04m 3/54
U.S. Cl. 179—18                                                    14 Claims

ABSTRACT OF THE DISCLOSURE

A switching system is arranged to transfer calls directed to certain called subscribers' lines to any other location arbitrarily selected by the called line. On each call from an automatic switching office to a station marked for transfer, the called office transmits back to the calling office, over the established connection, digits which have been stored previously in memory corresponding to the transfer station to which the call is to be transferred. The calling office thereupon automatically establishes an independent connection to the transfer office. When the call originates from an office without automatic call completion facilities an audible announcement is returned from the called office to the calling subscriber who may then reinitiate the call directly to the transfer station.

BACKGROUND OF THE INVENTION

Field of the invention

This invention relates generally to telephone switching systems and more particularly to switching network arrangements within such systems wherein calls directed to a particular subscriber are completed instead to some other telephone station arbitrarily preselected by the called subscriber for a selected interval of time.

Description of the prior art

Extensive development of telephone switching systems in recent years has made possible the provision of numerous special features which render telephone service more convenient and more flexible. For example, circuit arrangements have been provided whereby a special service subscriber, who is to be absent from his telephone for some period of time, may have incoming calls diverted to some other telephone station during such absence.

In existing temporary call transfer arrangements the voice communication path from the calling station is always extended to the transfer station through auxiliary equipment associated with the called line. For example, the J. Wicks U.S. Pat. 2,274,759 dated Mar. 3, 1942 teaches a transfer system wherein the auxiliary circuits for bridging the incoming call to the transfer station are permanently associated with the called subscriber's telephone. An improvement over this arrangement is disclosed in the W. Whitney U.S. Pat. 3,377,433 dated Apr. 9, 1968 which teaches a transfer system wherein the auxiliary voice bridging circuits are associated with the called line only while a call is being processed involving the called line.

An example of a most recent improvement in the utilization of voice bridging auxiliary circuits on transferred connections is disclosed in copending application T. R. Stevens, Ser. No. 737,923, filed June 18, 1968. As set forth therein, the connection between the auxiliary circuit and the called line is obviated by inhibiting the normal completion of an incoming call on that line and directing the call instead to an idle auxiliary switching circuit. The switching circuit thereupon initiates an outgoing call to the transfer station and acts as a bridge between the incoming line and the outgoing line so as to provide a continuous communication path between the calling subscriber and the subscriber at the transfer station.

On long distance connections, however, maintaining proper transmission quality on calls bridged through the called office is difficult. The problem arises because of transmission losses which are encountered on connections extending through more than one switching office. Since the transmission quality is dependent upon the transmission loss of the communication circuit, such loss must be maintained within certain limits for acceptable communication. Accordingly, because each switching office through which the call is routed inserts transmission loss, a limitation must be placed on the number of offices which may be interposed between the calling and called station. It follows therefrom that an incoming call which has been switched through a predetermined number of offices cannot be transferred through an additional office since the resultant transmission level may be below acceptable standards. Consequently, in the existing temporary call transfer systems, in order to avoid transmission difficulties, restrictions have been placed on the location of the transfer station in relation to the called station. Some installations have gone so far as to require that the transfer station be located within the same switching office as the called station. Thus, in present systems, the flexibility of the temporary transfer feature is severely limited.

In view of the foregoing, an object of this invention is to provide a temporary call transfer switching system which may be simply and economically implemented in existing systems so as to obviate the necessity for an extended connection between a calling subscriber's office and a called subscriber's office whenever the transfer function is activated.

Another object is to provide a switching system whereby a subscriber may have incoming calls automatically forwarded to any arbitrarily selected telephone station for a selected interval of time while maintaining proper transmission quality in the transfer connection.

A still further object is to provide a temporary call transfer switching system whereby an announcement is transmitted to a calling station indicating the directory number of the transfer station to which calls are currently being directed, whenever the call is unable to be automatically transferred.

SUMMARY OF THE INVENTION

These and other objects are obtained in accordance with an exemplary embodiment of the invention wherein a number of subscriber stations are provided with a special service feature known as temporary call transfer. A plurality of auxiliary call transfer circuits are also provided but in significantly lesser quantity than the aforesaid subscriber stations. Each such auxiliary circuit has three appearances: an A appearance, a B appearance, and a C appearance on the line side of the switching office network. A central memory associated with the switching system is arranged with a plurality of address locations each exclusively associated with a station served by the system and each addressable by the line equipment location of the respective station.

The switching system of the embodiment eliminates the transmission problem encountered on long distance connections by establishing the actual transfer at the switching office associated with the calling station. A call is forwarded from a calling office to a called office in the normal manner. The called office is arranged to screen incoming calls to determine whether the call is to be completed to the called station or is to be transferred. Upon determination that a particular call is to be transferred, the incoming trunk, which is normally connected to the called subscriber's line, is connected instead to the line link frame A appearance of an idle auxiliary transfer circuit. The transfer circuit thereupon signals the calling office over the established communication path that the call is to be transferred. A register, which is attached to the established connection at the calling office in response to the signal, causes the C appearance of the switching circuit in the called office to initiate a connection to a sender. The sender in the called office thereupon transmits to the register in the calling office, the directory digits of the transfer station. The original connection between the calling office and the called office then releases and a new connection is established to the transfer station under control of the calling office in the same manner as though the call had originated in the calling office. Communication is thereby possible from the calling station to the transfer station through the normal switching system without the insertion of auxiliary transfer circuits or switching offices into the final voice connection. Thus, proper transmission quality is maintained on the transfer connection at all times.

In the event the calling office is not arranged for automatic call transfer, as above set forth, the calling office does not acknowledge the interrogation signal transmitted from the switching circuits. Under this condition, the B appearance of the switching circuit at the called office is connected to an announcement circuit and an audible announcement is provided to the calling station over the established connection indicating the directory number of the transfer station to which the call should be directed. The calling subscriber may then redial the connection in accordance with the information received.

In accordance with one feature of my invention, a temporary call transfer switching system is arranged to accomplish the actual transfer at a switching office serving a calling station.

In accordance with another feature of my invention, a switching system is arranged to recognize a special status of a called line and to thereupon interrogate the calling office over the established communication path to determine whether the directory number of a transfer station should be returned in digital form or whether an audible announcement containing this information is necessary.

In accordance with another feature of my invention, a called office of a multiple office switching system is arranged to recognize the special status of a called line and to initiate a connection from a calling office to a preselected transfer station independent from an originally established connection from the calling office to the called office.

In accordance with another feature of my invention, a switching system at the called office is arranged to recognize the special status of a called line and to divert calls incoming to that line to an auxiliary transfer circuit and to thereupon transmit to the calling office the digits of a transfer number to which calls are to be transferred.

In accordance with still another feature of my invention, a switching system is arranged to recognize the special status of a called line so as to divert incoming calls to a transfer circuit and to thereupon connect an audible announcement circuit to the transfer circuit indicating the directory number of a transfer station to which calls should be directed.

DESCRIPTION OF THE DRAWING

The foregoing objects, features and advantages, as well as others of the invention, will be more apparent from the following description of the drawing in which:

FIGS. 2 through 14 are schematic drawings showing in greater detail the interrelation of the components of the exemplary embodiment; and FIG. 15 shows the manner in which the other figures should be arranged.

Figure 1:
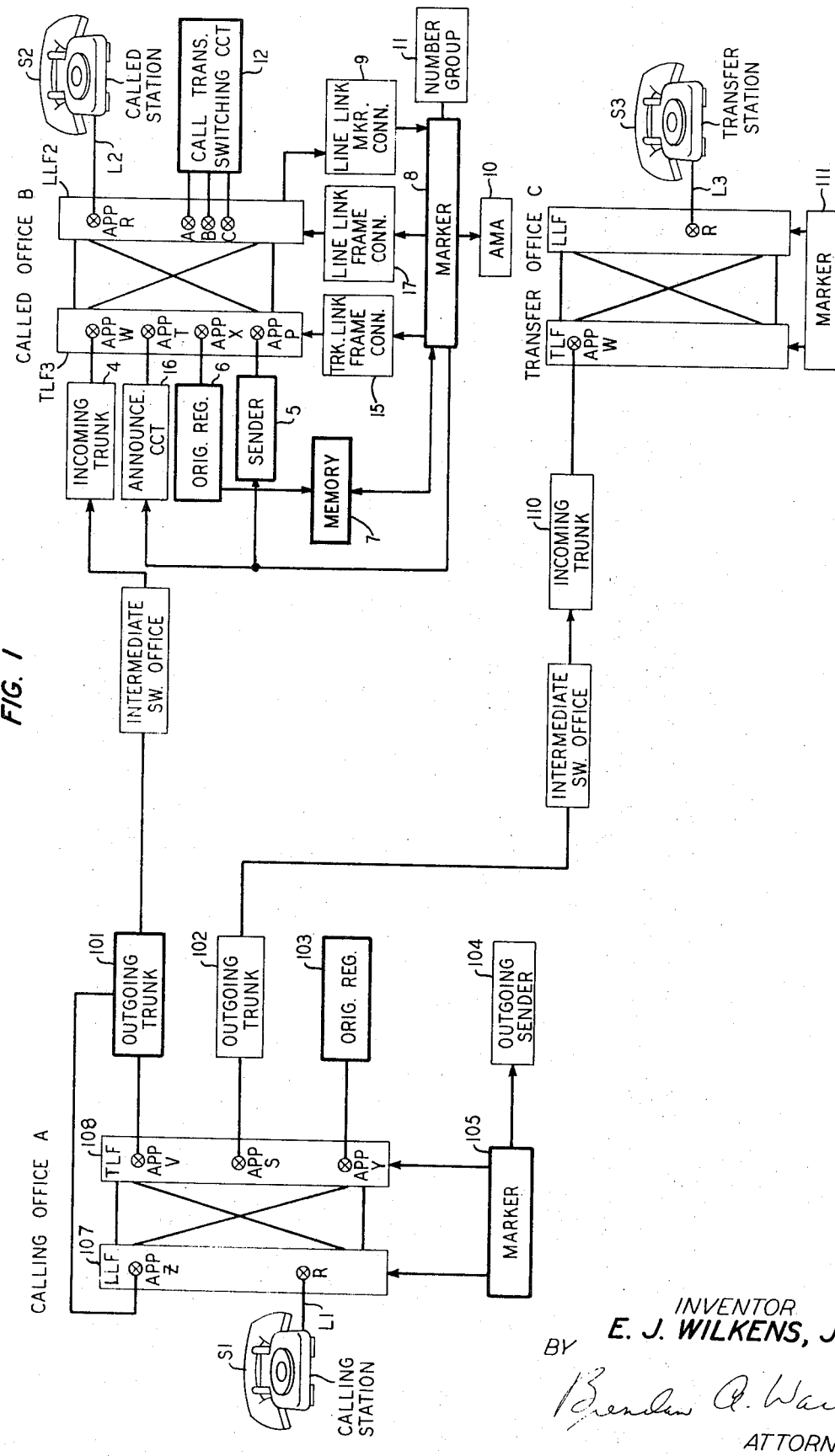
FIG. 1 is a block diagram showing the interrelation of the exemplary embodiment of the invention.

It will be noted that FIGS. 2 through 14 employ a type of notation referred to as "detached contact" in which an X shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the American Institute of the Electrical Engineers Transactions, Communications and Electronics, vol. 74, pages 505–513.

It will also be noted that in order to simplify the disclosure and thus facilitate a more complete understanding of the embodiment, the relays, relay contacts and other electromechanical devices shown in FIGS. 2 through 14 have been given systematic designations. Thus, the number preceding the letters of each device correspond to the figure in which the control circuit of the device is shown. Thus, the coil of relay 5T is shown in FIG. 5. Each relay contact, either make, break or transfer, is shown with its specific contact number preceded by the designation of the relay to which it belongs. For example, the notation 5T–1 indicates contact number 1 of relay 5T, the coil of which is shown in FIG. 5.

INTRODUCTION

The present invention is illustrated in an automatic switching system wherein common control circuits are employed to control the establishment of calls through a switching network. One such system is disclosed in the A. J. Busch, U.S. Pat. 2,585,904, issued Feb. 19, 1952. It is to be understood that the present invention is not, however, limited to use in a telephone system of this type but may be utilized in other types of switching systems.

The invention is described herein as being embodied in a telephone system of the type disclosed in the cited Busch patent. The invention is particularly concerned with apparatus in marker circuit 8, originating registers 6 and 103, sender 5, call transfer switching circuit 12 and in outgoing trunk 101, which are represented by the blocks shown with heavy lines in FIG. 1. The other equipment units of the Busch system are neither shown nor described in detail herein except where necessary for a complete understanding of the invention. The cited Busch patent may be consulted for a complete understanding of the construction and operation of other components of the Busch disclosure.

For purposes of illustration, it is intended that the apparatus of line link frame (LLF)2, trunk link frame (TLF)3, incoming trunks 4 and 110, outgoing trunks 101 and 102, originating registers 6 and 103, number group 11, markers 8, 105 and 111 and senders 5 and 104 be similar to the corresponding apparatus disclosed in the Busch patent. It is also intended that the apparatus of automatic message accounting (AMA) equipment 10 be substantially identical to that disclosed in H. D. Cahill et al., U.S. Pat. 2,599,358, dated June 3, 1952. It is further intended that memory circuit 7 may constitute any one of a number of configurations well known in the art operable to electrically record information in binary form at preselected address locations, each of which address location is effective to provide the information stored therein on a nondestructive read-out basis.

In order to simplify the disclosure and thus facilitate an understanding of the invention, the call transfer arrangement at the called office is arranged in a manner similar to that disclosed in the above-cited Stevens application. It will, of course, be obvious that the present invention is not limited to use with such a switching arrangement but, in fact, may be utilized with any number of temporary call transfer systems.

In order to further facilitate an understanding of the invention, the description of the operation of the exemplary embodiment has been sub-divided into a general description portion designated 1.00 and a detailed description portion designated 2.00. Section 1.00 and its subsections describe the invention in general terms with respect to FIG. 1. Section 2.00 and its subsections describe the invention in detail with respect to FIGS. 2 through 11.

*1.00 general description.*—The interrelation and function of the equipment units of the exemplary embodiment will now be described with reference to FIG. 1 wherein the interconnection between circuit blocks has been designated by arrows to indicate the direction of circuit action.

For purposes of illustration, we shall assume that a subscriber at station S2 anticipates a need to utilize the temporary call transfer feature which is available to that station. We shall also assume that the station to which the call is to be transferred is located at a point not served by the same switching office. However, as will be more apparent from that which is contained hereinafter, the transfer station may be advantageously located at any switching office, including the switching office serving station S2.

*1.1 establishment of a transfer number in memory.*— Referring now to FIG. 1, when station S2 goes off-hook, marker circuit 8 is arranged, as described in the aforementioned Busch patent, to connect line link frame 2 appearance R with trunk link frame 3 appearance X in the normal manner such that digits transmitted from station S2 will be received in originating register circuit 6. As further set forth in the Busch patent, marker circuit 8 then causes the registration of the class of service and the calling line equipment location of station S2 in the originating register. The marker thereupon releases from the connection.

Dial tone is returned to subscriber station S2 from originating register 6 in the well known manner upon completion of the aforesaid linkage. At this point we shall assume that the subscriber at station S2 has knowledge of a special code which signifies to the originating register, in a manner to be more fully set forth hereinafter, that the digits which will follow are to be stored in memory for future use as a transfer number. For purposes of illustration, we shall further assume that the code which initiates the temporary call transfer feature is "11." It should be noted at this point that the originating register may be arranged to accept any other combination of digits as an identification code. Accordingly, upon receipt of dial tone from originating register 6, a subscriber at station S2 dials (or key pulses) the digits 1 and 1 into the register. As will be more apparent from that which is contained hereinafter, originating register 6 is arranged to return second dial tone to station S2 a predetermined interval of time after the registration of this two digit code. Accordingly, upon receipt of the second dial tone the subscriber at station S2 transmits the digits corresponding to the directory number of the transfer station. For illustration purposes we shall assume this number to be the directory number of station S3. Upon receipt of these digits the originating register seizes memory circuit 7 in the manner to be more fully described hereinafter.

At this point, it should be noted that the originating register contains the line equipment location of station S2 together with the directory number of the transfer party. Accordingly, the originating register utilizes the equipment location number of station S2 as an address to provide access to a specific physical location within memory circuit 7. At this particular physical location the transfer station's identification number is stored under control of the originating register 6. Upon completion of the memory storage function, the register releases memory circuit 7. As will be more apparent from that which is contained hereinafter, originating register 6 also releases at this time. We shall assume for purposes of simplicity that the subscriber at station S2 now returns the subset to an on-hook condition.

Upon the release of originating register 6 the subscriber at station S2 is free to place outgoing calls in the normal manner. However, as will be apparent from that which follows, incoming calls to station S2 will be transferred to the transfer station S3.

*1.2 incoming call diverted to an auxiliary line switching circuit.*—We shall assume at this point that incoming trunk circuit 4 is activated by an incoming call which is directed to station S2. As set forth in detail in the Busch patent, when the marker receives the called line information, number group circuit 11 is interrogated to determine the line equipment information and ringing combination of the called party. In the instant case, upon so doing, the marker is arranged to recognize the privileged status of the called station from its preassigned ringing combination. To impart this information to the marker, the preassignment of a specified ringing combination may be utilized, as herein set forth. However, it will be obvious from that which is contained hereinafter that numerous other techniques may be employed. For example, an additional translation indication may be returned by the number group in the manner set forth in T. V. Burns et al., U.S. Pat. 3,264,415, dated Aug. 2, 1966.

Proceeding now with the description, in view of the special service status of station S2, the marker 8 is arranged, as will be detailed hereinafter, to interrogate memory 7 to ascertain whether station S2 currently has a transfer number stored therein. For this purpose, the marker utilizes the called line equipment location, as returned by the number group, as an address for the memory. Since the line equipment location associated with station S2 has a transfer number stored in memory, the marker is arranged to hunt, in the well known manner, for an idle call transfer switching circuit, such as switching circuit 12. Upon ascertaining the idle status of such a circuit, the marker thereupon, in a manner to be detailed hereinafter, causes the equipment location of the A line appearance of the selected switching circuit to be written into memory 7 at the address location of the called line. Memory 7 thereupon causes marker 8 to release the line equipment location information of the called line stored therein and substitutes therefor the line equipment location of the A appearance of the selected switching circuit. Marker 8 then completes the call, in the well known manner, from incoming trunk 4, appearance W on the trunk link frame 3, through the switching network to appearance A of the selected switching circuit. On completion of this connection ringing takes place in the well known manner.

Digressing momentarily, the failure of memory 7 to indicate that a transfer number is presently stored therein corresponding to the equipment location of the called line would result in the marker completing the call in the normal manner to the called station S2.

Returning now to FIG. 1, it is apparent that the incoming call has been diverted from the line appearance of station S2 and completed instead to the A line appearance of an auxiliary circuit. It should be noted that since the marker did not check the line appearance of station S2 for a busy condition prior to completing the call to the auxiliary circuit, the transfer function will proceed irrespective of whether the called station is busy or not.

*1.3 interrogation of the calling office by the called office.*—As previously set forth, upon establishment of a linkage from the incoming trunk to the auxiliary switching circuit, ringing tone is applied to the line. The switching circuit is arranged to immediately detect this ringing potential and to trip the ringing. The switching circuit thereupon initiates a signal over the extended linkage path to the calling office A. This signal is detected in the calling office by the outgoing trunk 101 which is arranged, via an auxiliary line link frame appearance Z to initiate a dial tone connection and thus have an originating register attached in the normal manner. Attachment of the originating register causes the auxiliary switching circuit in the called office, in the manner to be more fully detailed hereinafter, to become attached through the switching network to a sender for the transmission of the digital directory number of the transfer station S3.

Digressing momentarily, it should be noted that the called office may be aranged to select, from a class of service code assigned to the incoming trunk, whether the calling office is equipped for automatic call transfer. However, since the incoming connection may have been switched through numerous switching offices it would be necessary to modify each of these offices in order to insure that the proper trunk is selected for the final connection to the called office.

*1.4 transmission of the directory number to the calling office.*—As discussed previously, the connection of an originating register at the calling office to the linkage connection between the calling subscriber and the called office causes the attachment of a sender to the connection in the called office. Prior to attaching the sender the marker in the called office, which was called in to complete the linkage from the switching circuit to the sender, recognizes from the class of service associated with the switching circuit that memory 7 must be interrogated in order to process the call further. Accordingly, in the manner to be detailed hereinafter, memory 7 is arranged to correlate the equipment location number of the switching circuit with the equipment location number of the associated called line.

Digressing momentarily, it will be remembered that an association was made in the memory between the A appearance of the switching circuit and the called line when the incoming trunk was connected to the switching circuit. Since the other appearances of the switching circuit are fixed, the memory is able in the well known manner to perform the necessary correlation between a calling appearance and the A appearance associated with the called line.

Returning again to FIG. 1, when the called line identity is obtained, the memory transfers to the marker the directory number of the transfer station associated therewith. Upon receipt of this number the marker proceeds to establish a linkage between the switching circuit and the sender as set forth above and transfers to the sender the digits of the transfer station directory number. The sender thereupon transmits, in the well known manner, the directory number over the linkage connection from the called office to the originating register at the calling office.

Summarizing at this point, upon receipt of a call directed to a line arranged for temporary call transfer, the calling office is interrogated to determine whether a transfer station's directory number may be transmitted in digital form or whether a verbal announcement is required. Upon determining that digital transmission is possible, a sender is attached in the called office which transmits to an originating register in the calling office the information required to complete the call to the transfer station under control of the calling office.

*1.5 establishment of a call from the calling office to the transfer station.*—When the originating register in the calling office has received the directory number from the called office, as previously set forth, the talking path between these offices is released. The called office is thereby eliminated from the connection at this time. Concurrent therewith, a completing marker, such as marker 105, in the calling office is signaled in the well known manner by the originating register 103 and the call is processed in the normal manner under control of the marker 105.

For purposes of illustration, we shall assume that the transfer station S3 is located at some distant office, such as office C which is served via outgoing trunk 102 from the calling office. Of course, it will be obvious from that which is contained hereinafter that station S3 may be located in any switching office including the calling office A or the called office B.

In order to complete the call to the transfer station the completing marker 105 seizes outgoing trunk 102 and in the well known manner attaches outgoing sender 104 thereto. The directory number of the transfer station is then transferred to sender 104 and the call is completed via trunk 102 in the calling office to incoming trunk 110 in the transfer office in the normal manner. A talking path is thereby established from calling station S1 through the switching network in the calling office, through outgoing trunk 101, through its trunk link frame appearance Z, again through the switching network to outgoing trunk 102 and via any intermediate switching offices to the incoming trunk 110 at the transfer office C and to the transfer station S3 in the normal manner.

*1.6 transmission of an audible announcement to the calling station.*—In the situation where the calling office is not equipped to automatically receive the transfer station's directory number, such as when the calling office is a manual office, an originating register is not attached to the established connection in response to the interrogation signal transmitted from the called office. The switching circuit at the called office is arranged, as more fully detailed hereinafter, to detect the absence of the originating register at the calling office and accordingly initiate a connection through the switching network to an available announcement circuit, such as announcement circuit 16. Marker 8 is arranged to transfer to announcement circuit 16 the directory number of the transfer station which is obtained from memory 7 in the manner previously set forth. Announcement circuit 16 thereupon audibly transmits, via the switching network at the called office B and the switching circuit 12, over the interoffice trunk and any intermediate switching office to the switching office A and via the linkage connection to the calling station S1 the directory number of the transfer station S3. The calling subscriber may then reinitiate the connection in accordance with the information received.

*1.7 removing the transfer number from memory.*—The special services subscriber may at any time resume the termination of incoming calls to the station merely by transmitting a preselected two digit release code, in the manner set forth previously, to an originating register. For purposes of illustration, it is assumed that the release transfer code is "12." Therefore, upon transmission of the digits 1 and 2 from station S2, the originating register 6, in the manner fully detailed hereinafter, causes the memory 7 to remove the transfer number currently associated with the equipment location of the special services subscriber. Immediately thereafter all incoming calls to transfer station S2 will be completed in the normal fashion as previously set forth.

*2.0 detailed description.*—The following text will describe the embodiment of the invention in detail with reference to FIGS. 2 through 14. A cursory examination of these figures will reveal that certain relay contacts and relay designations have been enclosed in parentheses. The parenthetical symbol has been employed to facilitate a clear understanding of the invention by indicating that the apparatus which is enclosed therein is shown more fully in the earlier cited Busch or Stevens disclosures. Relay designations and contact designations which are unique to the instant embodiment are not enclosed in parentheses and, as will be more apparent from that which is contained hereinafter, are shown in complete detail.

We shall assume as hereinbefore set forth that station S2 is arranged for temporary call transfer service. We shall further assume that the corresponding class of service designation is class of service 29. It will thus be obvious, as set forth in the Busch patent, that during the establishment of an originating or terminating connection involving station S2, marker circuit 8 will ascertain the class of service of station S2 to be that designated 29 and therefore will function in accordance with that class of service in processing such connections. In the immediately following detailed description, we shall assume that station S2 desires to have incoming calls transferred to some other telephone location such as station S3 as hereinbefore set forth.

*2.1 establishment of a transfer number in memory.*—
Upon an off-hook condition of the subset at station S2, marker circuit 8 is seized by line link marker connector 9 in a manner identical to that set forth in detail in the earlier cited Busch patent. Since marker circuit 8 is seized by line link marker connector 9, only in conjunction with a dial tone request, marker circuit 8 prepares to obtain that information necessary for the completion of a dial tone connection.

Figure 2:
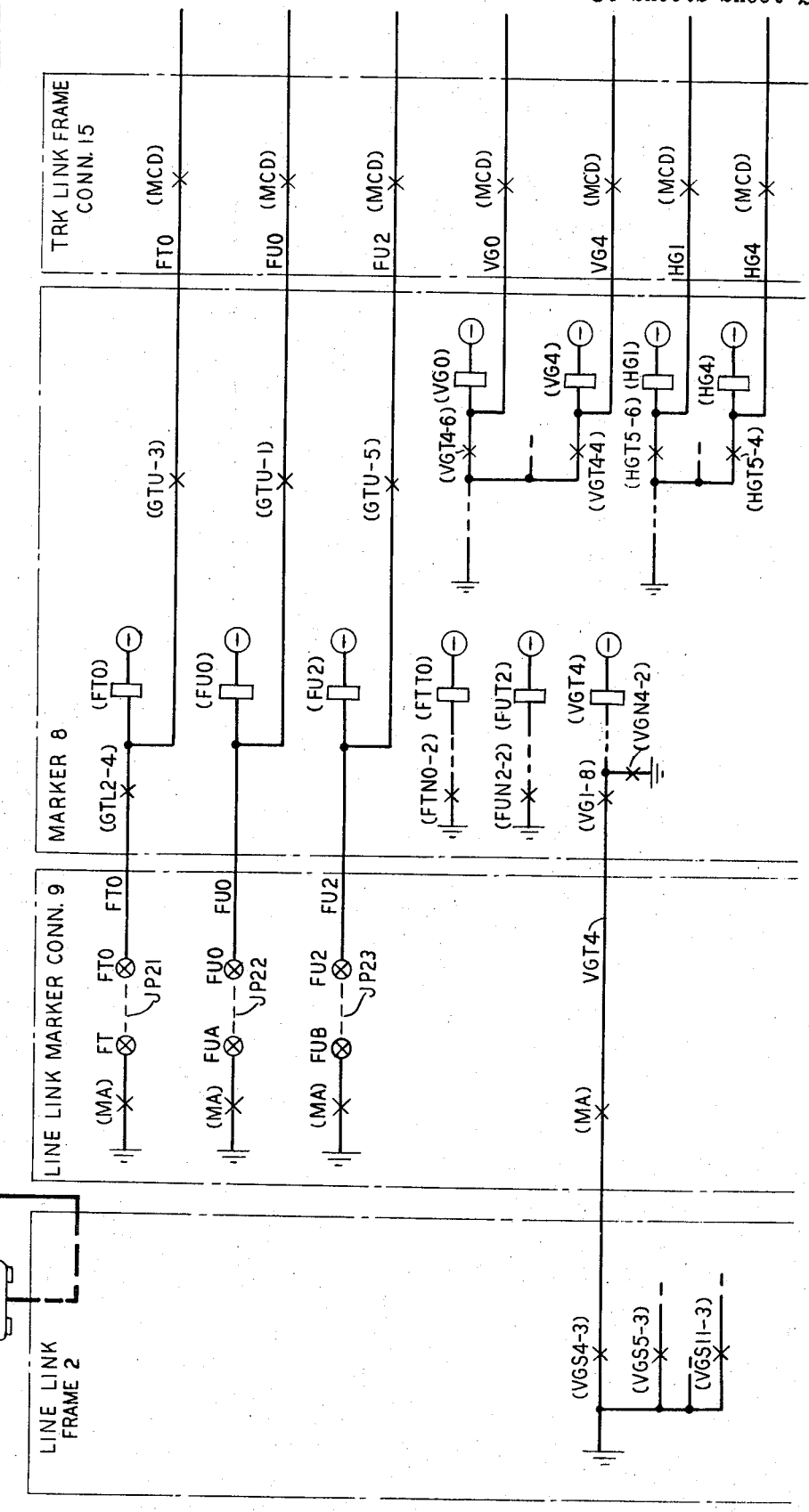
Figure 3:
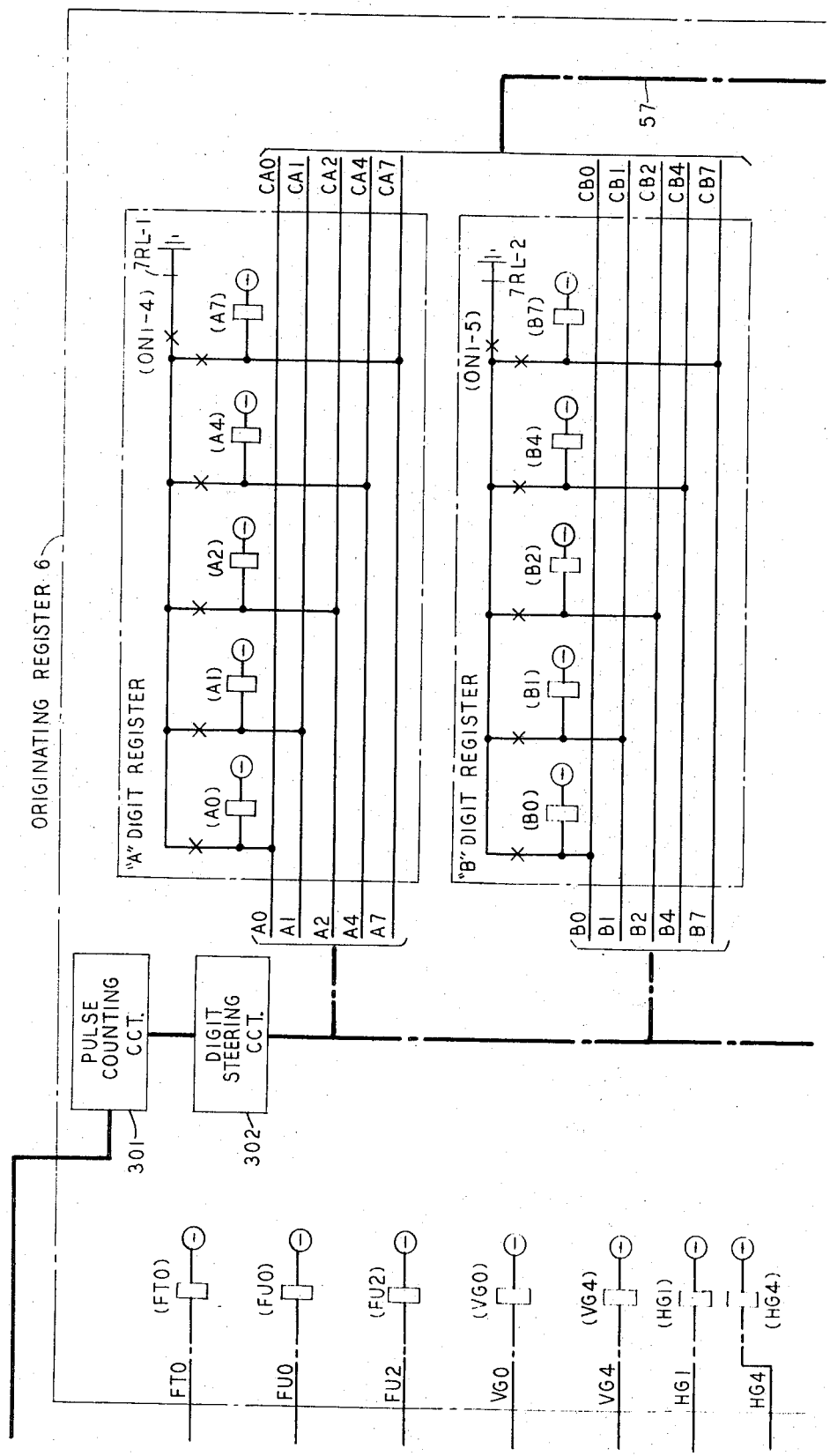
Figure 4:
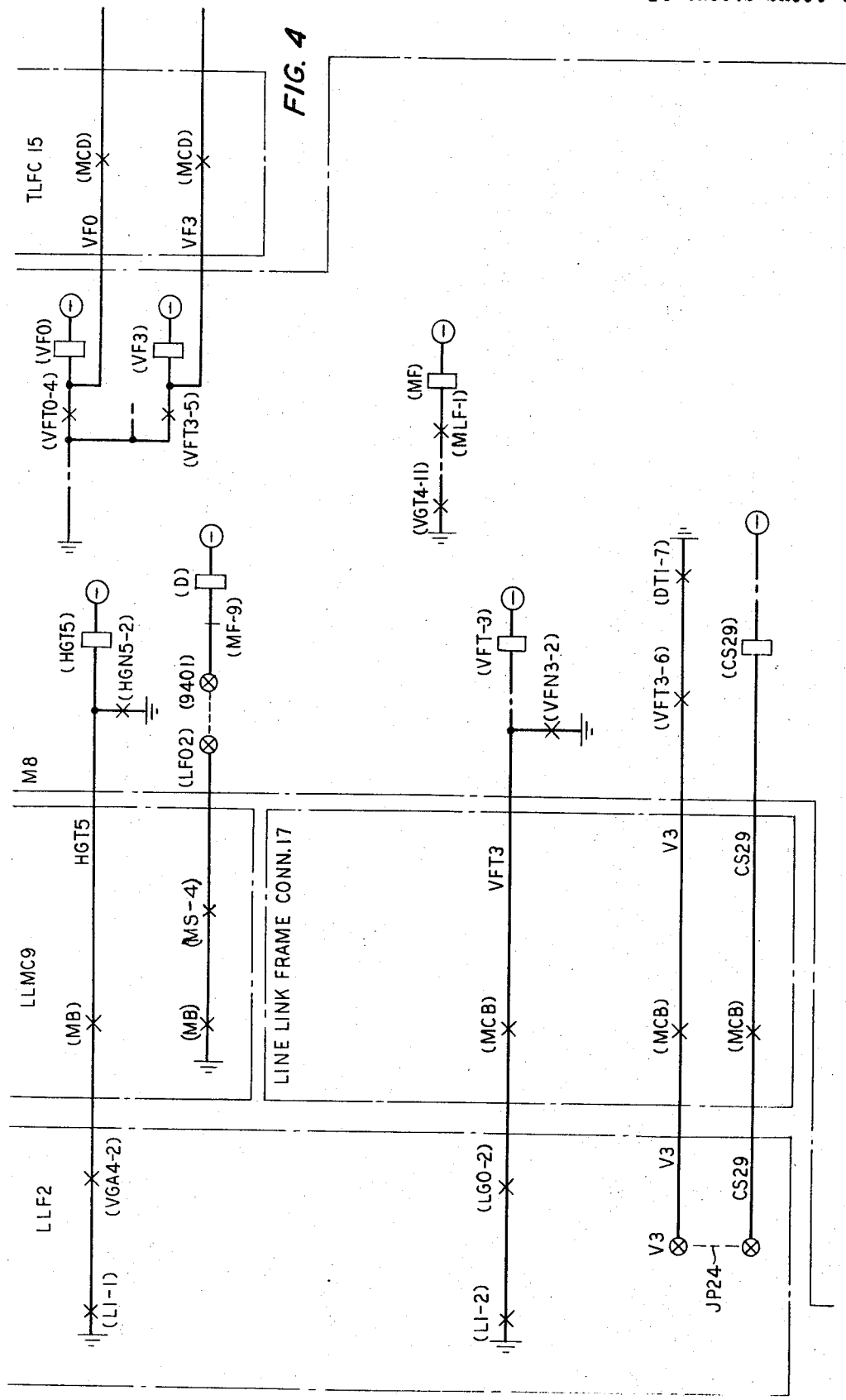
Figure 5:
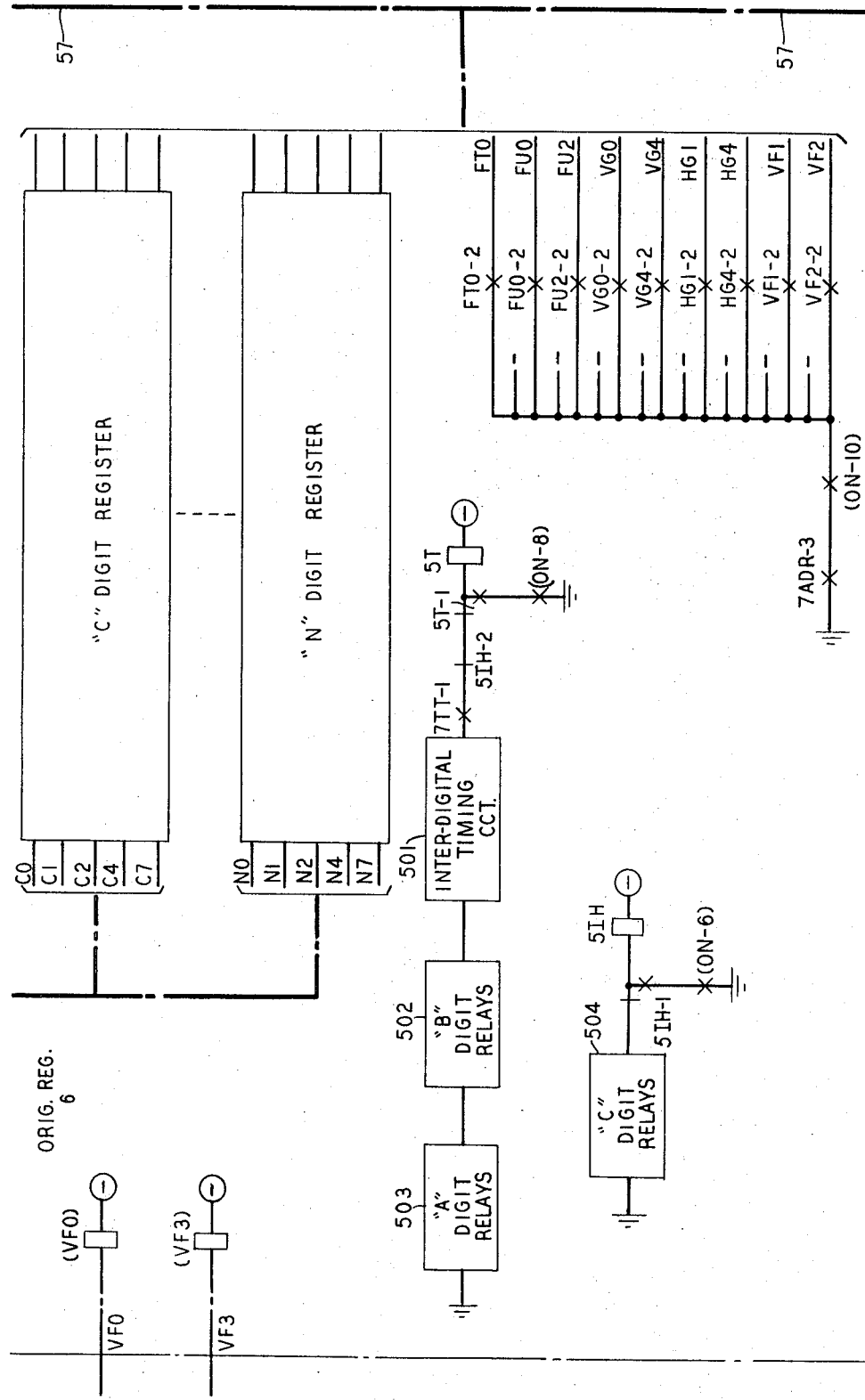

Referring now to FIGS. 2 and 4, line link marker connector 9 extends various line location information leads to marker circuit 8 to permit registration of the information which identifies the location of the calling line. Accordingly, relay (FT0) in marker circuit 8 operates by an obvious circuit which extends via the (FT0) lead to ground in line link marker connector 9, thus, recording a line link frame tens digit of 0. In similar fashion relays (FU0) and (FU2) (frame units digit) operate from ground extended to the marker from line link marker connector 9 thereby establishing that the origin of the connection is from a station located on line link frame 2.

In similar fashion, operated contacts on the (MA) relay in line link marker connector 9 extend ground on the (VGT4) lead to marker circuit 8 to operate relay (VGT4), thereby identifying the vertical group location of the calling station as vertical group 4. Similarly, ground extended on the (HGT5) lead from line link marker connector 9 identifies the station as being located in horizontal group 5 thus operating relay (HGT5). Concurrently therewith, the enabling of the marker start relay make contact (MS-4) extends ground from line link marker connector 9 to the (LF02) punching in marker circuit 8 to cause the operation of relay (D) by an obvious circuit. As discussed in detail hereinafter, relay (D) indicates a request for the completion of a conventional dial tone connection.

As set forth in the A. J. Busch patent, upon receiving the aforesaid information, marker circuit 8 seizes line link frame 2 via the associated line link frame connector which we shall assume to be line link frame connector 17 as shown on FIG. 4. After the aforesaid seizure, operated line link frame connector relay (MCB) extends those leads from line link frame 2 which are necessary to provide the vertical file location information of the calling station and also its preassigned class of service. Accordingly, at this time relay (VFT3) operates in marker circuit 8 from negative battery extended through the winding of the (VFT3) relay via the (VFT3) lead to line link frame connector 17, enabled connector relay (MCB), and through enabled make contacts (LG0-2) and (L1-2) to ground in line link frame 2.

As earlier noted, station S2 is preassigned class of service 29. Thus, the (CS29) relay operates in marker circuit 8 from negative battery extended through the (CS29) relay winding and via the correspondingly designated lead to line link frame connector 17, enabled make contact (MCB) to the (CS29) punching in line link frame 2 via jumper 24 to the V3 punching, and via the V3 lead through enabled make contacts of the (MCB) connector relay in line link frame connector 17, via the V3 lead to marker 8 and through enabled make contacts (VFT-6) and (DT1-7) to ground.

Summarizing at this time, upon an off-hook condition of the subset at station S2, line link marker connector 9 has enabled marker circuit 8 which, in turn, has seized line frame 2 via line link frame connector 17. Information identifying the line link frame, vertical group, horizontal group and vertical file has been recorded in marker circuit 8. In addition, relay (CS29) has operated in marker circuit 8 to identify the originating station as a station entitled to temporary call transfer. The importance of this identification will be more fully appreciated from that which is contained hereinafter.

Figure 6:
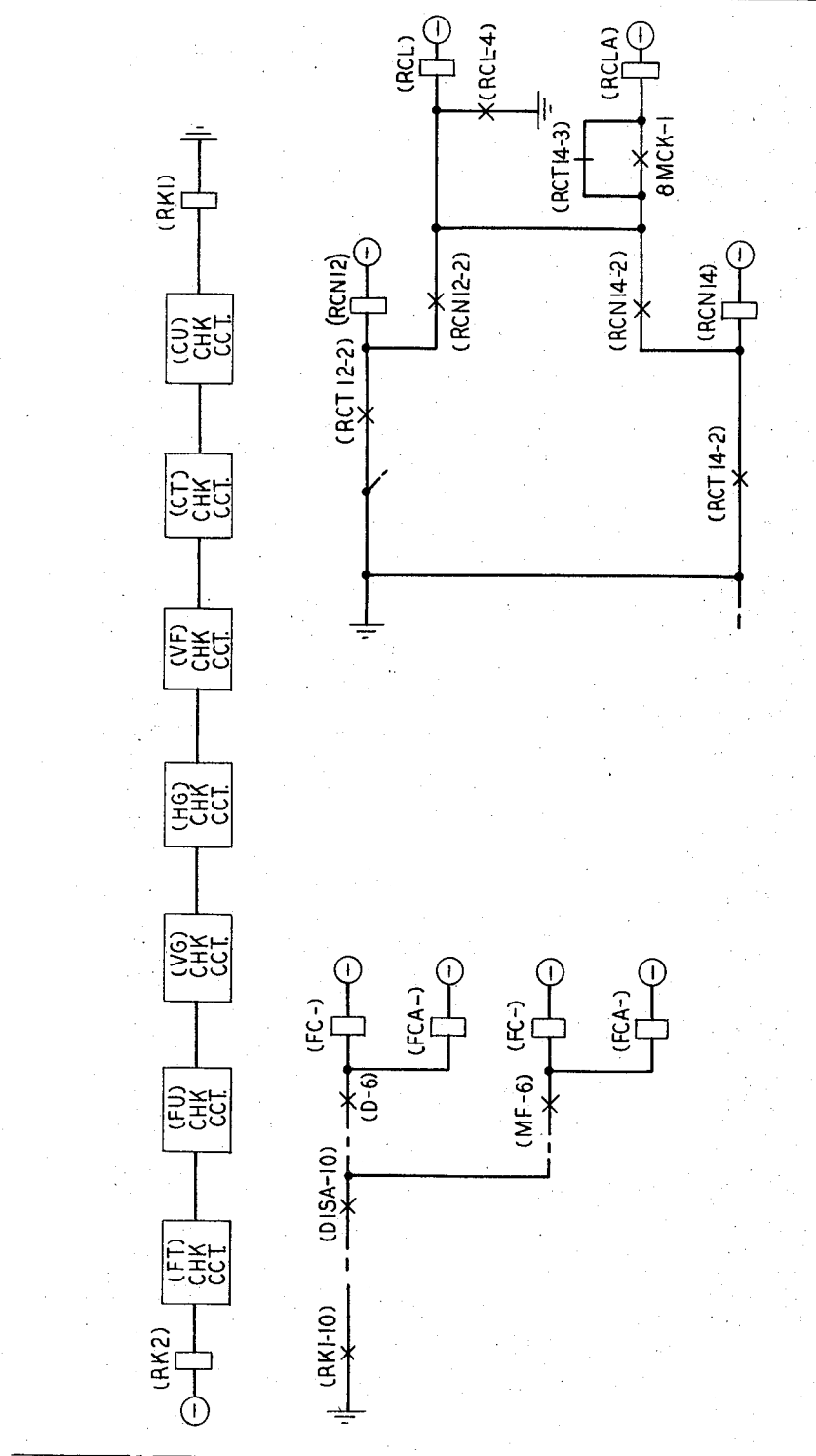

As shown in FIG. 6 and as more fully described in the Busch patent, relay (RK2) operates at this time to indicate that the aforesaid line equipment location information and class of service information have been obtained. Thus relays (RK2) and (RK1) operate by an obvious circuit through the various check circuits to ground present on the winding of relay (RK1). Accordingly, operation of relay (RK1) enables the operation of relays (FC-) and (FCA). FIG. 6, through enabled make contacts (RK1-10), (DISA-10) and (D-6). Relays (FC-) and (FCA-A) are associated with trunk link frames which may be utilized in the requested dial tone connection. Thus, marker circuit operation proceeds in a manner identical to that set forth in the above cited Busch patent for the establishment of a dial tone connection from an originating register.

Accordingly, marker circuit 8 proceeds to test for an available originating register. For purposes of the embodiment we shall assume that the marker seizes trunk link frame 3 so as to select originating register 6 at this time. Thus, as set forth in the Busch patent, connector relay (MCD) operates in trunk link frame connector 15, FIGS. 2 and 4, so as to accomplish the foregoing function and to extend a plurality of line location information leads and class of service indicating leads from marker circuit 8 to originating register 6. Thus, in the instant exemplary embodiment, the marker causes the operation of relays (FT0), (FU0), and (FU2) in originating register 6 to indicate the line link frame location of the calling station; and also the (VG0), (VG4), (HG1), (HG4) and (VF3) leads to indicate the specific equipment location of station S2 on line link frame 2 as earlier recited in detail. The operate path of the foregoing identification relays are set forth in detail in the earlier cited Busch patent and are also obvious from an inspection of FIGS. 2 through 5 and thus will not be repeated in the text herein.

Concurrently with the transmission of the aforesaid line location information, the class of service information of station S2 is also transmitted by the marker. Since we have assumed that station S2 is classified as one of a group of stations designated as class of service 29, relays (CT2), (CU2) and (CU7), which are not shown but are symbolically represented by class of service translator 707 (FIG. 7), will operate at this time and provide a ground on output lead A. The translator circuit 707 may comprise any number of configurations well known in the art to provide continuity between two leads upon the transmission of a specified class of service, in this case class of service 29.

Having recorded the aforesaid information, as well as other data pertinent to subsequent handling of the call in originating register 6, marker 8 releases so as to be available to serve other calling connections. Prior to so releasing, marker 8 establishes a linkage connection from appearance R of station S2 on line link frame 2 to appearance X of originating register 6 on trunk link frame 3 in a manner identical to that set forth in the Busch patent. Thus, as shown on FIGS. 2 and 3, a continuous communication path extends from the subset at station S2 through to pulse counting circuit 301 in originating register 6. Dial tone is returned in the well-known manner to signify that the calling station may commence transmission of the necessary digital information and we shall assume that the subscriber desires at this time to enable the transfer feature. We shall further assume that the subscriber has knowledge of the two digit code "11" which represents an identification to the originating register, in a manner to be more fully detailed hereinafter, that a transfer number is to be placed in memory.

As earlier set forth herein, we shall assume that the subscriber at station S2 generates the digits "1" and "1"

in sequence as a manifestation of a request that station S2 thereafter be provided with the call transfer special service feature. The aforesaid two digits are counted in pulse counting circuit 301 and are extended through digit steering circuit 302 so as to be registered in the A digit register and the B digit register, respectively, in a manner identical to that set forth in the Busch patent. Accordingly, registration of a "1" in the A digit and a "1" in the B digit registers, respectively, of FIG. 3 will result in the grounding of leads CA0, CA1, CB0, CB1 in the well known 2-out-of-5 fashion. Concurrent therewith, relays 7CA0, 7CA1, 7CB0 and 7CB1 (FIG. 7) operate over an obvious path from the corresponding leads of the register relays, FIG. 3, via cable 57. These relays thereupon lock operate in an obvious manner and provide an operate path for the 7TT relay from battery through the winding of the relay, released break contact 7CB2–1, enabled make contacts 7CB1–1, 7CB0–3, 7CA1–1 and 7CA0–1, to ground which, as has been set forth previously, is present on output lead A of class of service translator circuit 707.

At this point for simplicity of disclosure we shall assume that the subscribed has been informed that where a two-digit code is not followed by subsequent digits within a predetermned interval of time, such as, for example, ten seconds, then the aforesaid code will be recognized as a transfer number storage request. We shall, therefore, assume that this interval of time transpires thus completing a circuit for the operation of relay 5T which extends from negative battery through the winding of relay 5T, released transfer contact 5T–1, released break contacts 5IH–2, enabled make contact 7TT–1 through interdigital timing circuit 501 which may comprise any number of configurations well known in the are operable to provide continuity between two leads after a predetermined time interval, and through 2-out-of-5 check circuits 502 and 503 which consist of a configuration of operated relay contacts on two of the five relays in the A digit register and two of the five relays in the B digit register, respectively, to ground. Thus, relay 5T operates at this time and locks operated through transfer contact 5T–1 and (ON–8) to ground to thereby manifest to originating register 6 that a two-digit code has been transmitted which is recognized to be a request for the activation of transfer service.

Deviating momentarily, it will be noted that relay 5IH will be enabled in response to the operation of 2-out-of-5 of the registration relays in the C digit register. Were this to occur, enabled break contact 5IH–2 would thereby prevent the operation of relay 5T since the enabling of the C digit register indicates that the preceding A and B digits are not associated with a request for storage of a transfer number.

Figure 7:
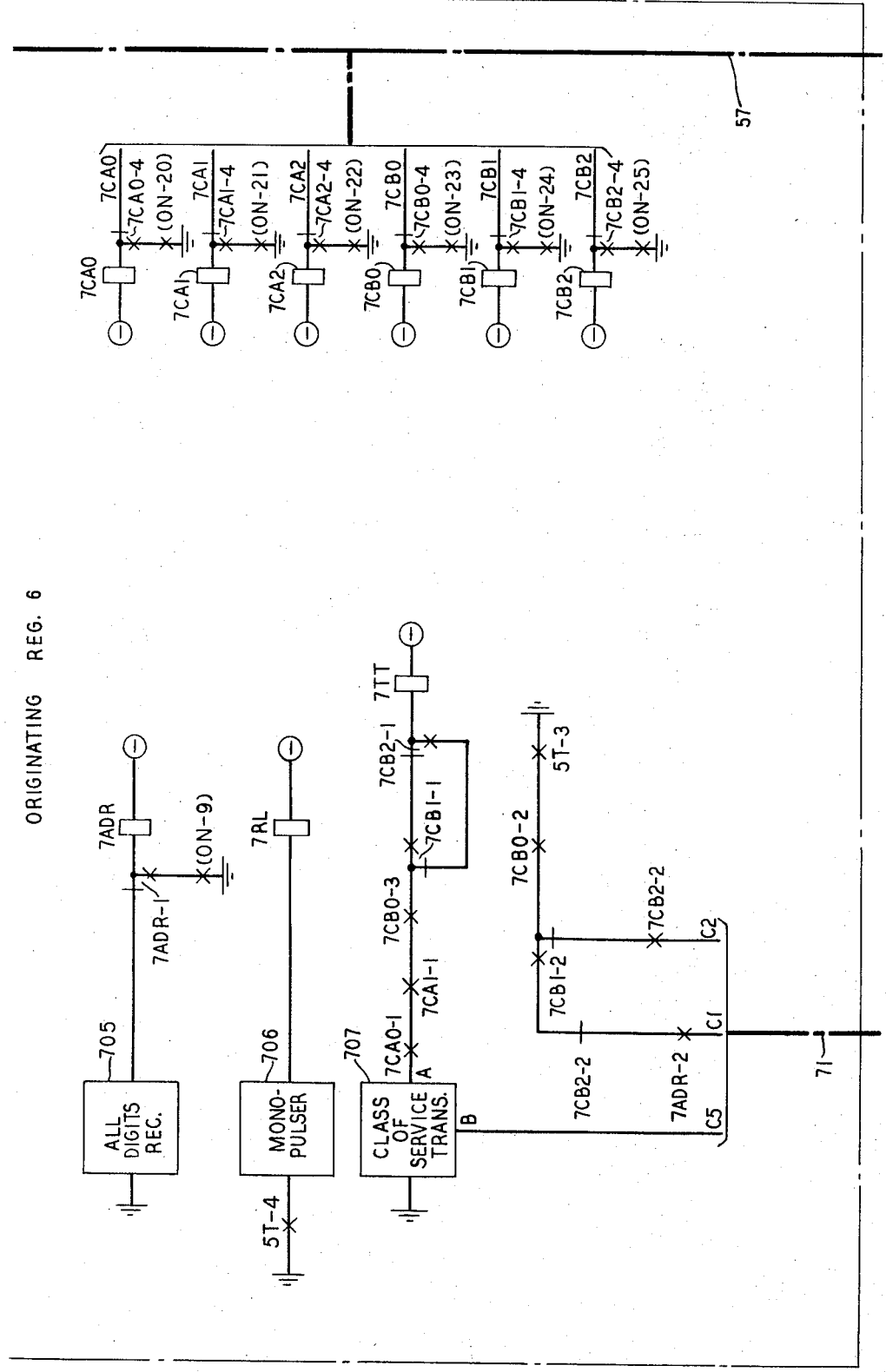

Referring now to FIG. 7, the enabling of make contact 5T–4 extends a ground to monopulser circuit 706 which may be any one of a number of configurations well known in the art operable to provide at the output one current pulse for each application of ground at the input. Accordingly, relay 7RL momentarily operates and thereby causes the registration relays of registers A and B (FIG. 3) to release by momentarily removing the holding ground via enabled break contacts 7RL–1 and 7RL–2. The operation of relay 7RL also causes the digit steering circuit 302 of originating register 6 to recycle, in the well known manner, and to again apply dial tone to the station S2.

As previously set forth, the subscriber then transmits the digits corresponding to the telephone directory number of the transfer station. These digits are stored in registers A through N, FIGS. 3 and 5, of originating register 6 in the well known manner as fully detailed in the Busch patent. Accordingly, the all digits received circuit 705, which may be advantageously arranged in any one of the well known configurations to provide a ground at the output whenever the originating register has received all the dialed digits, operates relay 7ADR in an obvious fashion. The enabling of relay 7ADR extends a ground via enabled make contacts 5T–3, 7CB0–2 and 7CB1–2, released break contact 7CB2–2, enabled make contact 7ADR–2 over lead C1 to memory circuit 7, input-output registers, FIG. 9, via cable 71.

As noted earlier, it is intended that memory circuit 7 may comprise any one of a number of configurations of memory circuits well known in the art operable to electrically store information at a particular address location, which information may be obtained subsequently from that address location on a nondestructive readout basis.

Figure 9:
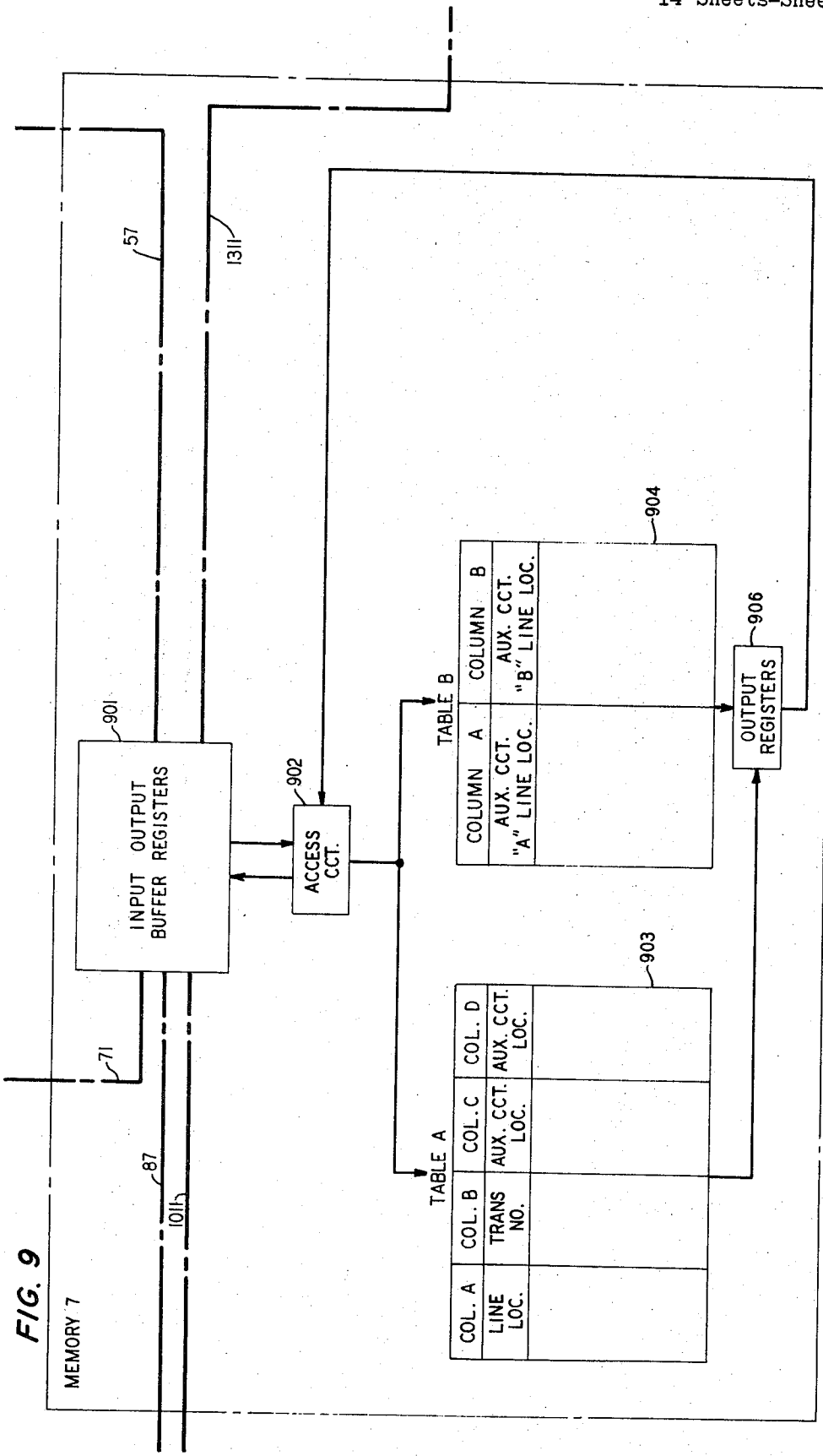

Turning now to FIG. 9, the aforesaid ground potential on cable 71 indicates to memory 7, as well known in the art, that a write function is required. Concurrent with the enabling of the C1 lead, a plurality of grounds via enabled make contacts 7ADR–3, (ON–10) and the enabled ones of the contacts FT0–VF2 (FIG. 5). are extended over leads FT0–VF2 and via cable 57 to buffer registers 901 in memory circuit 7. An examination of the respective designations of these leads will reveal that they constitute two basic groups of information. The first group of information is the equipment location information of station S2 (as earlier recited this information will serve as an address for a specific location in memory); and the second group of information is the transfer directory number of the station to which calls are to be transferred. Thus, memory 7, FIG. 9, writes in table A 903, column A, the equipment location of the called line and writes in column B, the transfer number associated with this location. The importance of this association will be more fully appreciated from that which is to follow.

It will be noted that the aforedescribed circuit action, after receipt of the transmitted digital information, takes place in an extremely brief interval of time since it is fully automatic in nature and does not depend upon any physical action part of the associated subscriber or maintenance personnel. We shall assume that the subscriber at station S2 now abandons the connection having recorded the transfer number for future use, It is, of course, obvious that numerous techniques well known in the art may be employed to transmit an audible signal to station S2 to indicate the completion of the aforesaid function in accordance with the subscriber's command.

Summarizing at this point, memory circuit 7 contains the transfer number to which subsequent incoming calls, which are directed toward station S2, are to be diverted. Outgoing calls originating from station S2, however, will not in any way be affected by such registration and accordingly will be completed through the switching network in the normal manner.

*2.2 incoming call diverted to auxiliary circuit.*—Assuming that an incoming call were to arrive via incoming trunk 4 as shown in FIG. 1, an incoming register will be attached to receive the called line directory number as set forth in detail in the Busch patent. As further described in detail in the Busch patent, a marker such as marker circuit 8 is thereupon seized and the called line directory number is forwarded to the marker by the incoming register which thereupon releases. It should be noted that at this point the directory number may consist of only the last four digits of the originally dialed number which correspond to the line location of the called station. Since the marker is unable to complete a connection to a called line based merely upon a digital directory number, it is necessary for this directory number to be translated into physical equipment location information. As set forth in detail in the Busch patent, a number group circuit, such as number group 11, is seized by marker circuit 8 to translate this directory number information into the physical number equipment location of the called station in terms of line link frame number, vertical group number, horizontal group number, vertical file number and ringing combination. This information is thereupon registered in the corresponding digit registers 801 (FIG. 8).

As discussed in detail in the Busch patent, the ringing combination assigned to the called station may be utilized to also indicate a particular status such as two-party line service or PBX service. In the instant arrangement ringing combination 14, as manifested by operated relay (RCT14) in FIG. 8, indicates to the marker that the called station is a special service station requiring an interrogation of memory 7 to determine whether the call should be completed in the normal manner or diverted instead to a transfer location.

Figure 8:
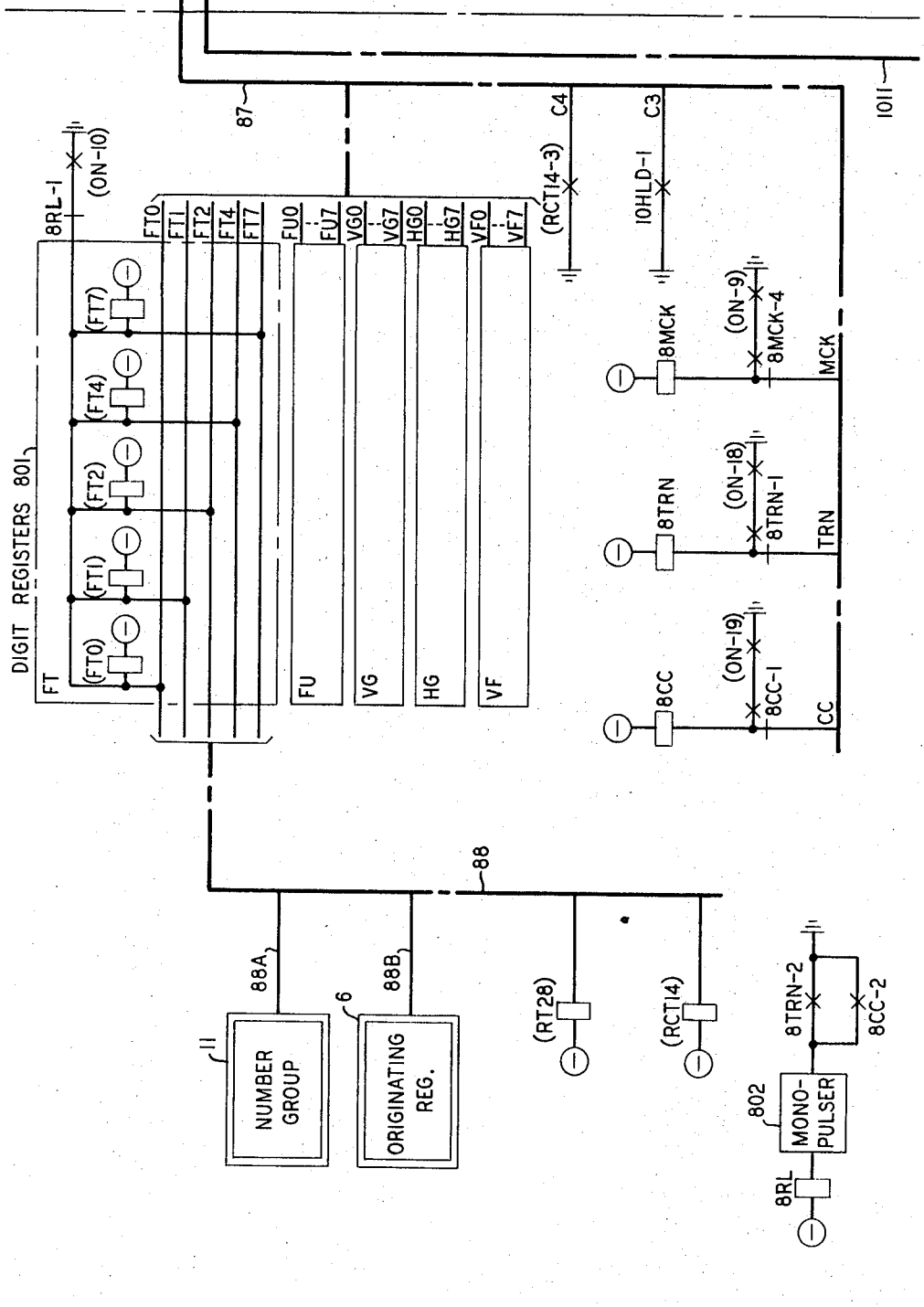

Referring now to FIG. 8, the enabling of make contact (RCT14–3) provides a ground on lead C4, via cable 87, to memory 7, FIG. 9. Memory 7 is arranged, in the well known manner, to initiate an interrogate function whenever the C4 lead is grounded. The memory thereupon obtains the equipment location numbers currently contained in digit registers 801, via cable 87, as an address for interrogation purposes. Upon ascertaining that a transfer number is in fact registered in the memory corresponding to the equipment location of the called line, the memory causes the operation of relay 8TRN via cable 87, FIG. 8. Relay 8TRN operating, locks operated to enabled make contact (ON–18) and also provides a ground via enabled make contact 8TRN–2 to monopulser circuit 802, thereby momentarily operating relay 8RL in the manner previously discussed for relay 7RL. Accordingly, the momentary operation of released break contact 8RL–1 removes the holding ground for each of the operated register relays 801, thereby releasing the previously stored line equipment location information which had been contained therein.

Figure 10:
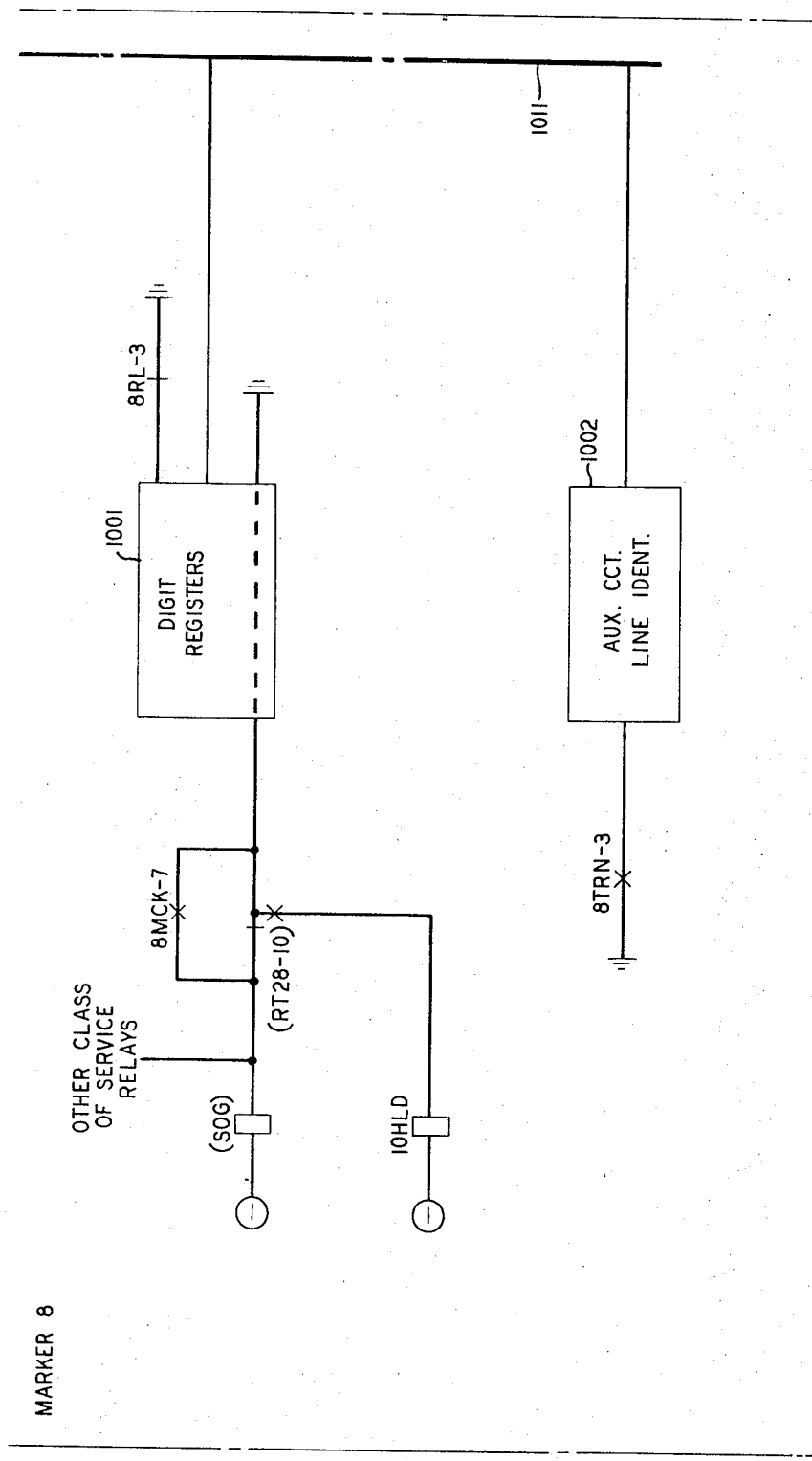

Turning now to FIG. 10, the operation of relay 8TRN also provides a ground, via enabled make contact 8TRN–3, to the auxiliary circuit line identifier 1002 which is operative, in the well known manner, to cause the marker to hunt for an idle auxiliary circuit. The equipment location identification numbers of the A line link frame appearance of the selected transfer circuit are stored therein and transferred to memory 7, via cable 1011. Memory 7 is arranged to accept this equipment location and to write the information in the well known manner in Table A 903, column C (FIG. 9) at the physical location addressed by the originally called line equipment number. Concurrently therewith, memory 7 transfers this equipment number to the now empty register 801, via cable 87. The marker 8 now contains all the information necessary to complete the incoming call to the "A" line appearance of an auxiliary switching circuit which now acts as the station appearance of the called line. Memory 7 thereupon causes the operation of relay 8MCK via an obvious path over cable 87. Relay 8MCK operating, locks operated to enabled make contact (ON–9) and enables, as will be seen from that which is to follow, the marker to continue processing the call.

Turning now to FIG. 6, as set forth in detail in the Busch patent, the operation of relay (RCLA) manifests a check of the successful reception of the ringing combination information from the number group. In the instant arrangement the operation of relay (RCLA) is delayed until the enabling of make contact 8MCK–1. Operation of the 8MCK relay, as set forth above, thereby completes an obvious operate path for relay (RCLA) which enables the completion of the call to the equipment location number now contained within digit registers 801.

Digressing momentarily, the failure of memory 7 to indicate that a transfer number is presently stored therein corresponding to the equipment location of a called line results in the immediate operation of relay 8MCK, without substituting equipment location numbers in the digit registers 801, thereby allowing the call to be processed to completion in the normal manner to the called station S2.

Summarizing at this point, the called line equipment location information which had been received from the number group has been erased from the marker registration relays and has been replaced with the line equipment location of switching circuit 12, appearance A. The line equipment location of appearance A has also now been stored in memory at an address corresponding to the originally called line equipment location.

In the manner set forth in detail in the Busch patent, a linkage connection is thereupon completed from appearance T, FIG. 1, of incoming trunk 4 to appearance A of switching circuit 12. The marker releases at this time and ringing tone is transmitted, in the well known manner, from incoming trunk 4 to the A appearance of switching circuit 12.

Figure 11:
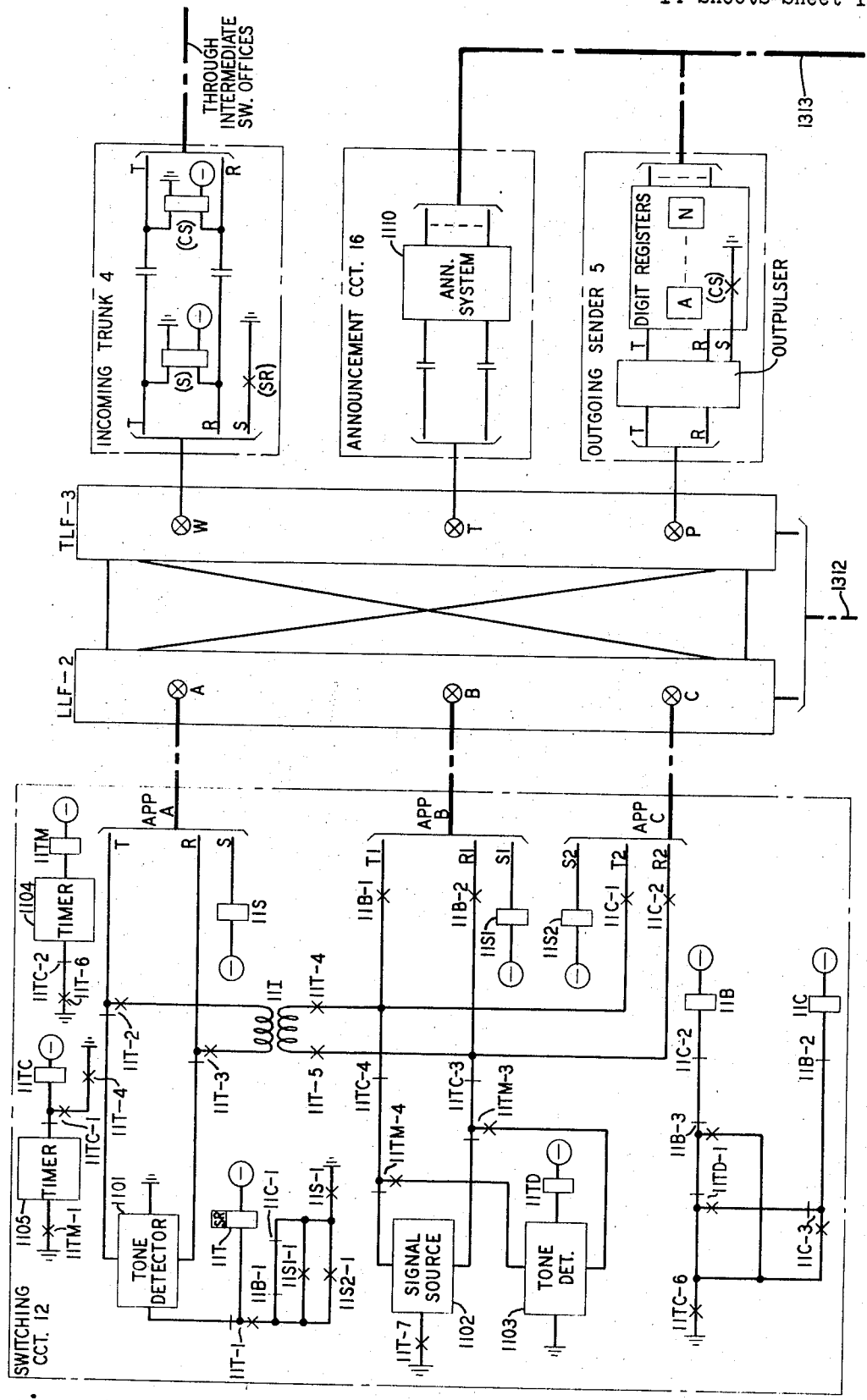

*2.3 interrogation of the calling office by the called office.*—As previously set forth, upon establishment of a linkage from the incoming trunk to the auxiliary circuit, ringing tone is applied to the line. Referring now to FIG. 11, ringing potential on conductors T and R of appearance A switching circuit 12 operates tone detector 1101 which may comprise any one of a number of circuit configurations well known in the art operable to detect ringing voltage impressed upon the T and R conductors. Accordingly, relay 11T is enabled by ground extended from the detection circuit, released break contact 11T–1 and the winding of the 11T relay to battery.

Relay 11T operating locks operated over its own make contact 11T–1, released break contacts 11B–1 and 11C–1 to ground via enabled make contacts 11S–1. Relay 11S is operated at this time by the switching ground extended through the switching network via lead S. The operation of relay 11T provides a ground via enabled make contact 11T–6 and released break contact 11TC–2 to timer circuit 1104 which may comprise any one of the circuit configurations well known in the art for providing ground at the output a certain interval of time after ground is applied to the input. During this delay interval relay 11TM remains normal and ground from enabled make contact 11T–7 to signal source 1102 is effective to provide a tone signal on leads T and R of appearance A via released break contacts 11TM–3, 11TM–4, 11TC–3 and 11TC–4, enabled make contacts 11T–4 and 11T–5, inductor 11I, and enabled make contacts 11T–2 and 11T–3. Signal source 1102 may be arranged in any one of the well known configurations operable to provide a source of tone at the output upon the application of ground to the input. Accordingly, the tone from signal source 1102 is transmitted through the switching network via the incoming trunk 4 and any intermediate switching office to the outgoing trunk 101 at the calling office A (FIG. 12).

Figure 12:
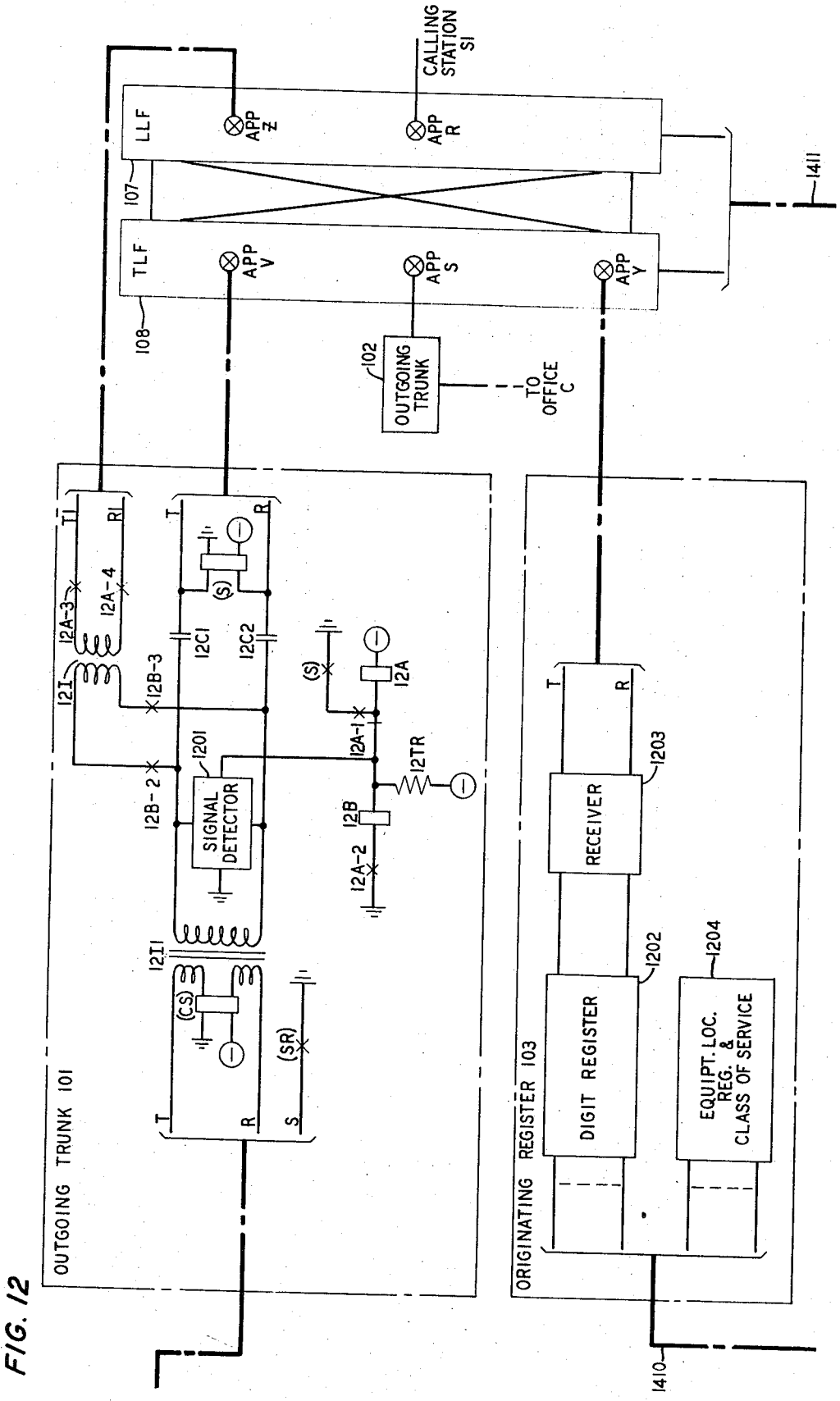

Turning now to FIG. 12, the tones transmitted from the called office are received by outgoing trunk 101 and detected by signal detector 1201 which may be arranged in any one of the well known configurations operable to provide ground at the output whenever tones of a certain type, such as those transmitted from the called office, are received. Accordingly, ground is extended through released break contact 12A–1 through the winding of relay 12A to battery. Accordingly, relay 12A locks operated via enabled make contact 12A–1 to ground via the enabled (S) relay. Relay 12B remains normal at this time from ground extended from the signal detector 1201 to the winding side of resistor 12TR. The operation of relay A provides a low impedance via enabled make contacts 12A–3 and 12A–4 and inductor 12I between leads T1 and R1 of the auxiliary appearance of the outgoing trunk to appearance Z on the line link frame. Accordingly, the dial tone marker 105 (FIG. 14) in the well known manner thereupon recognizes this closure as a dial tone request and attaches an originating register in the normal manner through the switching network. The originating register, upon connetcion to the auxiliary appearance of the outgoing trunk, returns dial tone over the T1 and R1 leads to inductor 12I via an obvious path. The importance of this tone will be more fully appreciated from that which is to follow.

Returning now to FIG. 11, at the end of the timed interval, timer 1104 enables the operation of relay 11TM in an obvious manner. Ground is thereby extended via enabled make contact 11TM–1 to timer 1105 which is arranged in the same manner as timer 1104 to provide ground at the output a certain interval of time after ground is applied to the input. Accordingly, relay 11TC remains normal at this time. The operation of relay 11TM removes signal source 1102 from the linkage connection via transfer contacts 11TM–3 and 11TM–4 which thereupon connects tone detector 1103 to the connection. Tone detector 1103 may be advantageously arranged in any one of the well known circuit configurations for providing ground at the output whenever dial tone signals are present across its terminals.

Turning again to FIG. 12, removal of the signal source at the called office causes signal detector 1201 in outgoing trunk 101 to remove ground from the output, thereby enabling the operation of relay 12B from ground via enabled make contact 12A–2 through the winding of relay 12B to battery via resistor 12TR. Accordingly, dial tone which is present on inductor 12I as an acknowledgment that an originating register is attached, is extended via enabled make contacts 12B–2 and 12B–3 and inductor 12I1 over the T and R conductors and incoming trunk 4 to the switching circuit of the called office through the linkage connection.

Turning again to FIG. 11, dial tone is received via the A appearance of switching circuit 12, leads T and R, enabled make contacts 11T–2 and 11T–3, inductor 11I, enabled make contacts 11T–4 and 11T–5, released break contacts 11TC–4 and 11TC–3 to tone detector 1103 via enabled make contacts 11TM–3 and 11TM–4. Accordingly, tone detector 1103 enables the operation of relay 11TD in an obvious manner. At the end of the timer 1105 delay interval, relay 11TC is operated via released break contact 11TC–1 and thereupon locks operated via enabled make contact 11TC–1 and enabled make contact 11T–4 to ground. The operation of relay 11TC provides an operate path for relay 11C from ground via enabled make contacts 11TC–6 and 11TD–1, released break contacts 11C–3 and 11B–2, through the winding of relay 11C to battery. The operation of relay 11C provides a low impedance path on appearance C of the line link frame via leads T2 and R2, enabled make contacts 11C–1, 11C–2, 11T–4, 11T–5 and the winding of inductor 11I. The marker 8 is thereupon signaled in the well known manner that a linkage connection is necessary. The marker is arranged, as previously detailed, to detect the class of service associated with appearance C, which in this case we may assume to be class of service 27.

Figure 13:
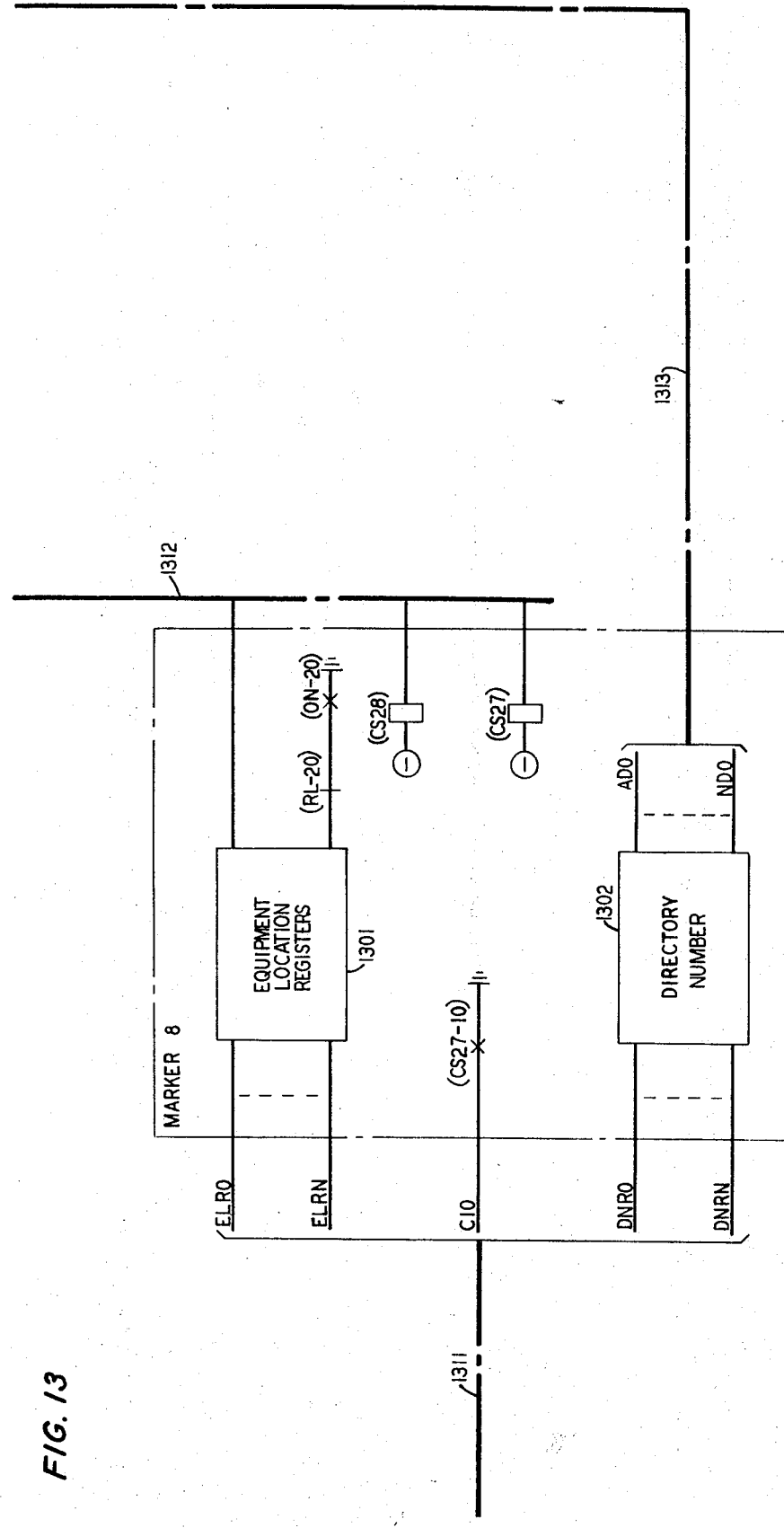

*1.4 transmission of digital directory number to the calling office.*—Referring now to FIG. 13, the enabling of relay (CS27) in marker 8, corresponding to class of service 27, provides a ground via lead C10 and enabled make contact (CS27–10) to memory 7 (FIG. 9). Memory 7 is arranged to thereupon accept from marker 8 the equipment location numbers of appearance C which are stored in equipment location registers 1301.

Turning now to FIG. 9, the memory 7 thereupon searches column B of table B 904 (FIG. 9) for the corresponding auxiliary circuit A appearance line location. The memory utilizes the auxiliary A line location, as obtained from column A, to locate in the well known manner the currently associated transfer number in column B of Table A 903. The correlated transfer-directory number is thereupon read out of memory from Table A, column B and transmitted via cable 1311 to the directory number registers 1302, FIG. 13 of marker 8. Returning now to FIG. 13, marker 8, which now contains both the directory number of transfer station and the equipment location number of the switching circuit, selects an idle sender, such as sender 5 on the trunk link frame 3 and establishes a linkage connection through the switching network to the equipment location of appearance C of switching circuit 12 on the line link frame 2. It should be noted that for purposes of illustrating the embodiment senders are connected to trunk link frame appearances in the same manner as are trunk circuits and originating registers.

Upon seizing an available sender the marker 8 causes memory 7 to erase the equipment location number of switching circuit 12, which is no longer required in memory, and transfers to the attached sender the directory number, previously obtained from memory, corresponding to the transfer station to which the call is to be transferred. Outgoing sender 5 thereupon transmtis the transfer station's directory data in the well known manner through the linkage connection, through switching circuit 12 and over the interoffice trunk to the calling office. This data is received at the calling office (FIG. 12) via outgoing trunk 101 and transmitted via the line link frame appearance Z to the previously attached originating register 103 and is stored therein in digit registers 1202.

Returning again to FIG. 11, the outgoing sender 5, upon the completion of the digit transmission function, releases from the connection, thereby removing the switching ground from lead S. Accordingly, relay 11S2 in switching circuit 12 releases in an obvious manner. The release of relay 11S2 removes the locking path of relay 11T via released make contact 11S2–1. Relay 11T, releasing, removes the low impedance path from leads T and R of appearance A, thereby releasing in the well known manner the connection of incoming trunk 4 to the calling office A. Switching circuit 12 is thereby restored to its normal conditon and since, as previously set forth, the association between switching circuit 12 and the called station has been erased from memory, it again becomes available for the completion of other calls directed to an activated transfer station.

*2.5 establishment of a call from the calling office to a transfer station.*—Referring again to FIG. 12, originating register 103 contains, as discussed previously, the directory number of the transfer station as received from the called office. The originating register thereupon calls in a completing marker, in the well known manner, which is arranged to complete the call in accordance with the information stored in the register in the same manner as though the call had originated from appearance Z.

For purposes of illustration, we have assumed that the call is to be transferred to transfer office C which is connected to office A (FIG. 1). The marker 105, FIG. 14, after performing the necessary translations, seizes an available outgoing trunk such as outgoing trunk 102. An available outgoing sender, such as sender 104, is attached to the seized trunk and the transfer station's directory digits, as transferred from the originating register 103 to marker 105, are transmitted thereto. The sender, in the well known manner, proceeds to transmit the directory number over the established connection from the calling office A to the transfer office C, which now becomes the called office. A completing marker, such as marker 111, FIG. 1, is called in to complete the connection to the called line, which in this case is station S3. A talking path is thereby established from the calling station S1, through appearance R of the line link frame, through the switching network to appearance V of the originally attached outgoing trunk 101 and via its auxiliary appearance through the switching network again to appearance S of the outgoing trunk 102 and via any intermediate switching office to the transfer station S3 located in transfer office C. The subscriber at calling station S1 is thereby in telephonic communication with the subscriber at station S3 through a talking path which is not extended through originally called office B but instead is established directly from calling office A.

It should be noted that the outgoing trunk 101, which was utilized to establish the original call to the called station, may also be eliminated from the connection to the transfer station by any one of a number of system arrangements, as for example, the calling office may be arranged with a memory in the same manner as the called office so as to record the association of appearance Z of the outgoing trunk with the calling line. In addition, it will be noted that when the transfer call is directed to an office which may be reached by the previously connected trunk, that trunk may be utilized for the connection.

*2.6 transmission of an audible announcement to the calling station.*—Returning now to FIG. 11, it will be remembered that upon the attachment of an originating register in the calling office, tone detector 1103 had operated and enabled the operation of relay 11TD. In the event the calling office is not arranged for automatic temporary call transfer, an originating register is not attached to the connection and relay 11TD in switching circuit 12 at the called office remains normal. At the end of the timed interval, relay 11TC operates in the manner previously discussed. However, transfer contact 11TD-1 remains normal, thereby extending ground from enabled make contact 11TC-6, released break contacts 11TD-1, 11B-1 and 11C-2 to the winding of relay 1B to battery. Accordingly, relay 11B operates, thereby providing a low impedance path for appearance B of switching circuit 12 via enabled make contacts 11B-1, 11B-2, 11T-4, and 11T-5 and the winding of inductor 11I. The marker 8 is arranged, as previously discussed, to detect the class of service associated with appearance B, which we shall assume at this this time to be class of service 28. Accordingly, relay (CS28) operates in marker 8 as an indication that an announcement circuit must be attached to appearance B via a linkage connection in the well known manner. Accordingly, marker 8 seizes an available announcement circuit, such a announcement circuit 16, and transfers thereto the directory number of the transfer station as obtained from memory 7 in the manner previously detailed for automatic call transfer. Announcement system 1110 of announcement circuit 16, which may be any one of the well known systems, operable to provide voice announcements in response to digital information, such as the arrangement disclosed in U.S. Pat. 2,951,908, dated Sept. 6, 1960 to W. A. Malthaner et al., is thereupon enabled to provide an audible announcement in accordance with the information obtained in digital form from marker 8.

The announcement, which may be in any suitable form, such as "The party you have dialed may be reached by redialing the connection to the following directory number . . .," will be transmitted from the announcement circuit, through the linkage connection to the switching circuit, through the switching network and via the previously established connection to the calling office and through the calling office switching network to the calling subscriber. The subscriber at station S1 thereby audibly receives the transfer station's directory number from the called office and may redial the connection in accordance with the information received in order to complete the call to the desired subscriber.

*2.7 removing the transfer number from memory.*—The special service subscriber at station S2 may remove the transfer number from memory at any time and thus resume the termination of incoming calls to that station. As previously set forth, it is assumed that the release transfer code which must be transmitted by the subscriber for this purpose is "12". The subscriber's line, upon going off-hook, is connected, in the manner previously set forth, to an originating register, such as originating register 6.

Turning now to FIG. 7, upon receipt of the digits 1 and 2 from the subscriber, relays 7CA0, 7CA1, 7CB0 and 7CB2 operate in the manner previously set forth for the transfer activation code. Accordingly, class of service translator 707, in the manner previously set forth, extends ground via enabled make contacts 7CA0-1, 7CA1-1, and 7CB0-3, released break contact 7CB1-1 and enabled make contact 7CB2-1 through the winding of relay 7TT to battery. The operation of relay 7TT enables the operation of relay 5T in the manner previously set forth. The operation of relay 5T at this time extends ground from enabled make contacts 5T-3 and 7CB0-2, released break contact 7CB1-2 and enabled make contact 7CB2-2 over lead C2 to memory 7 via cable 71. Line equipment information is also transmitted to the memory at this time via cable 57. The memory 7 is instructed thereupon to erase from table A903, column B, the transfer directory number associated therein with the equipment location number of the calling station. The calling station equipment location number is obtained, in the manner previously set forth, via cable 57 from the originating register which thereupon returns dial tone, in the well known manner, to station S2 as an indication that the erase function has been completed. Incoming calls directed to station S2 will now be terminated thereto in the normal manner.

*2.8 conclusion.*—While the equipment of this invention has been shown in a particular embodiment wherein connections directed to a privileged line are diverted to an auxiliary switching circuit and independently completed to a transfer station under control of the calling office, it is to be understood that such an embodiment is intended only to be illustrative of the present invention and that numerous other arrangements may be devised by those skilled in the art without departing from the spirit and scope of the invention.

What is claimed is:

1. In a communication system,
   a plurality of stations each having a unique designation,
   means at each of said stations for transmitting any of said designations to a first switching network,
   means at said first switching network for receiving said designations,
   means responsive to each reception of one of said designations for establishing a first connection through said first switching network to another switching network,
   means for transmitting any said received designation from said first network to said other network,
   means for releasing said first connection, and
   means at said other network responsive to a certain said designation for transmitting another designation to said first network and for enabling said releasing means.

2. In a communication switching system the combination set forth in claim 1 wherein:
   said other designation is transmitted from said other network to said first network in digital form.

3. In a communication switching system the combination set forth in claim 2 further comprising:
   means for inhibiting said digital transmission, and
   means controlled by said inhibiting means for transmitting a representation of an audible form of said other designation.

4. A communication switching system comprising:
   a plurality of stations each identified by a unique directory number,
   a memory,
   means controllable by certain of said stations for recording in said memory the directory number of another of said stations,
   means for establishing communication paths from a calling one of said stations to a station appearance of a called one of said stations, and
   means responsive to the establishment of a communication path from a calling one of said stations to a called station having a recorded directory number associated therewith in said memory for transmitting said recorded directory number over said established communication path to said calling one of said stations.

5. A communication switching system as defined in claim 4 wherein:
said transmitting means comprises means for digitally transmitting said directory number,
means for transmitting a representation of an audible form of said directory number on said established communication path,
means associated with a switching network connected to said called station for determining whether a switching network connected to said called station is equipped to receive said digital transmission, and
means controllable by said determining means for inhibiting said digital transmission and for enabling said audible representation transmitting means.

6. A communication switching system comprising:
a plurality of switching networks,
means for establishing a first connection between a calling one of said networks and a called one of said networks in accordance with digital information received by said calling network,
means at said called network for transmitting previously stored digital information over said established connection to said calling network, and
means at said calling network operable in response to receipt of said digital information for establishing another network connection in accordance with said transmitted digital information.

7. A communication switching system as defined in claim 6 wherein:
said called network includes a plurality of auxiliary switching circuits,
means for terminating said established connection at an idle one of said switching circuits, and
means in said switching circuit responsive to said termination for applying an interrogation signal to said established connection.

8. A communication switching system as defined in claim 7 wherein:
said calling network includes a plurality of registers operable to receive said transmitted digital information, and
means responsive to receipt of said interrogation signal from said called network for enabling an idle one of said registers.

9. A telephone switching system comprising:
a plurality of switching networks,
a plurality of stations at each of said networks,
means for marking any of said stations,
means for establishing a connection between a calling one of said stations and a called one of said stations in response to data transmitted from a calling station to the network associated with said calling station,
means in a network associated with a marked station responsive to a call directed to said station for transmitting previously stored data over an established connection to said calling network, and
means responsive to receipt of said previously stored data in said calling network for establishing a connection from said calling station to a station associated with said received data.

10. A telephone switching system as defined in claim 9 further comprising:
announcing means in said called network for returning an announcement to said calling station, and
means controllable by said called network for inhibiting said data transmission means and for enabling said announcing means.

11. A telephone switching system comprising:
a plurality of switching networks,
a plurality of stations each identified by a unique directory number at each of said networks,
a memory,
means controllable by certain of said stations for recording in said memory the directory number of another of said stations,
means for directing connections from a station associated with a calling one of said networks to a station associated with a called one of said networks,
a plurality of switching circuits at said called network,
a plurality of senders at said called network,
means responsive to a first connection directed to a station having a recorded directory number associated therewith in memory for terminating said first connection to an idle one of said switching circuits through said called network,
means in said switching circuit for transmitting tones over said first connection to said calling network,
means concurrently operative with the enabling of said transmitting means for measuring a timed interval,
means for reeceiving acknowledgment signals over said first connection from said calling office,
means responsive to receipt of said acknowledgment signals for inhibiting said timed interval measuring means,
means controlled by said inhibiting means for enabling another connection between said switching circuit and an idle one of said senders,
means responsive to said enabling of said other connection for transferring from said memory to said sender said recorded directory number associated with said called station, and
means responsive to the enabling of said transferring means for transmitting said transferred number to said calling network.

12. A telephone switching system as defined in claim 11 wherein said calling network comprises:
a line link frame,
an originating register,
an outgoing trunk serially connected in said first connection and having a line link frame appearance,
means in said outgoing trunk for receiving said transmitted tones, and
means responsive to receipt of said tones for enabling a dial tone connection between said originating register and said line link frame appearance of said outgoing trunk.

13. A telephone system as defined in claim 11 further comprising:
a plurality of announcement circuits,
means controlled by said timing interval measuring means and responsive to the expiration of said measured timed interval for enabling another connection between said switching circuit and an idle one of said announcement circuits, and
means responsive to said enabling of said other connection for transmitting a recorded announcement to said calling network 14. In a communication switching system:
a called station having a unique designation,
a call transfer switching circuit having a plurality of appearances,
means for diverting calls incoming to said called station to one appearance of said switching circuit,
means independent of said called station for transmitting a designation of another station, and
means for connecting said transmitting means to a second appearance of said switching circuit.

References Cited
FOREIGN PATENTS
1,126,209   9/1968   Great Britain.

WILLIAM C. COOPER, Primary Examiner